US006837030B2

(12) United States Patent
Drebing et al.

(10) Patent No.: US 6,837,030 B2
(45) Date of Patent: Jan. 4, 2005

(54) AUTOMATED METHOD FOR PLACING SLICED FOOD STACKS IN PACKAGES

(75) Inventors: Timothy J. Drebing, Middleton, WI (US); Timothy T. Watson, Waunakee, WI (US); Peter V. Doll, Madison, WI (US); Gary Skaar, Marshall, WI (US); Paul Doll, Madison, WI (US); Randy J. Glynn, Fall River, WI (US)

(73) Assignee: Kraft Foods Holdings, Inc., Northfield, IL (US)

( * ) Notice: Subject to any disclaimer, the term of this patent is extended or adjusted under 35 U.S.C. 154(b) by 0 days.

(21) Appl. No.: 10/697,195

(22) Filed: Oct. 30, 2003

(65) Prior Publication Data

US 2004/0139706 A1 Jul. 22, 2004

Related U.S. Application Data

(60) Continuation of application No. 10/633,751, filed on Aug. 4, 2003, now abandoned, which is a division of application No. 09/815,457, filed on Mar. 23, 2001, now abandoned.

(51) Int. Cl.[7] ................................................ A22C 21/00

(52) U.S. Cl. ............................. 53/517; 53/250; 53/513; 53/540; 83/39; 83/431; 83/437.2; 83/858

(58) Field of Search .......................... 53/517, 518, 514, 53/540, 247, 250, 513; 83/856, 857, 858, 932, 618, 624, 437.2, 437.3, 425.3, 427, 431

(56) References Cited

U.S. PATENT DOCUMENTS

| | | | | |
|---|---|---|---|---|
| 3,057,386 A | * 10/1962 | Massaro | .................... | 83/356.1 |
| 3,245,447 A | * 4/1966 | Jones | .......................... | 83/167 |
| 3,797,070 A | * 3/1974 | Bonami et al. | ............... | 83/488 |
| 3,807,266 A | * 4/1974 | Camp | ........................ | 83/404.4 |
| 3,910,141 A | * 10/1975 | Divan | ........................... | 83/26 |
| 4,254,678 A | * 3/1981 | Steiner et al. | ............. | 83/425.3 |
| 4,709,535 A | * 12/1987 | Mahaffy et al. | .............. | 53/473 |
| 5,018,338 A | * 5/1991 | Jurchuk et al. | ............... | 53/532 |

* cited by examiner

*Primary Examiner*—Scott A. Smith
*Assistant Examiner*—Thanh Truong
(74) *Attorney, Agent, or Firm*—Fitch, Even, Tabin & Flannery

(57) ABSTRACT

A system and method are provided that allow meat logs to be manually loaded into a slicing station and thereafter be continuously automatically processed at the slicing station, a harping station, and an insertion station for automated packaging thereof without the need for handling of the meat stacks by workers. To this end, the slicing station is effective to form smaller sections or chubs from the meat logs and to do so such that the chubs are provided with substantially parallel flat end-faces to ensure that high quality meat slices are generated therefrom. The chubs are then transported to the harping station where each of the chubs undergoes a single cutting operation, thus simultaneously forming the meat slices therefrom and substantially maintaining the slices in the configuration of the chubs for generating well-formed stacks of the slices. Thereafter, the stacks are received at the insertion station where they are transferred to their packages, on an automated basis without the need for manual handling thereof. This is enabled due to the well-formed stacks generated by the harping station which allows the stacks to be dropped into the packages aligned therebelow.

8 Claims, 27 Drawing Sheets

Fig. 8
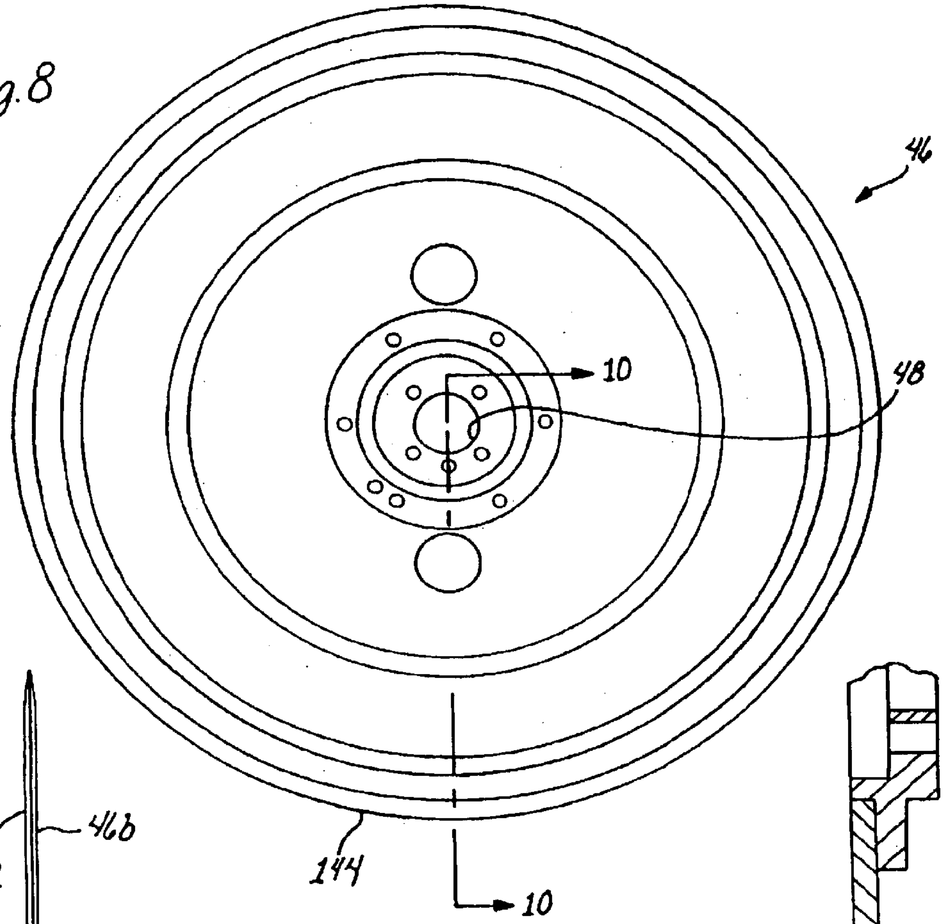
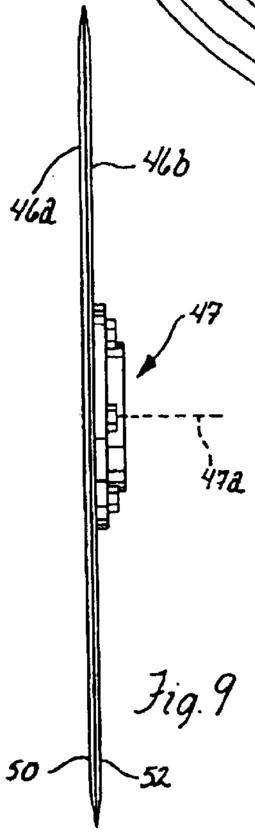
Fig. 9
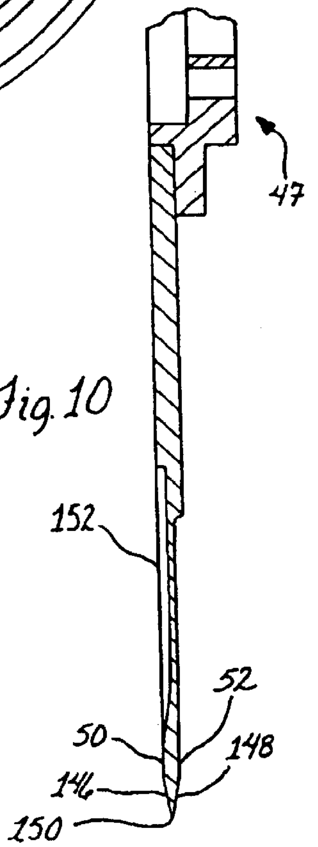
Fig. 10

AUTOMATED METHOD FOR PLACING SLICED FOOD STACKS IN PACKAGES

CROSS-REFERENCE TO RELATED APPLICATIONS

This application is a continuation of U.S. Ser. No. 10/633,751, filed on Aug. 4, 2003, now abandoned, which is a divisional application of U.S. Ser. No. 09/815,457, filed on Mar. 23, 2001, now abandoned.

FIELD OF THE INVENTION

The invention relates to an automated system and method for slicing meat products and placing the sliced meat products in stacked form into packages.

BACKGROUND OF THE INVENTION

In a prior process for slicing and packaging smaller sized slices of luncheon meat, e.g. slices on the order of 1.75 inches in diameter and 0.120 inch in thickness, the luncheon meat is sliced into a stack that is then manually placed into a package. More particularly, the package includes a multi-compartment tray, and the worker grabs a stack of slices off of a conveyor for placement into a particular one of the tray compartments.

A problem with the above-described system and method is in forming the stacks of meat slices. Currently, an initial meat slice is cut from a log of the luncheon meat product with the cut slice free-falling onto the conveyor surface. Subsequent slices similarly undergo a free-falling action for landing in a stack one on top of the other until the desired number of slices in the stack has been achieved. Thereafter, the stack of slices is advanced downstream by the conveyor to the insertion station where they are manually placed into the tray compartments, as described above. It has been found that it requires very precise control over the process parameters in order for the stacks to develop in a well-defined manner with the above-described process.

More specifically, the logs are fed toward a cutting blade that has its cutting faces substantially orthoganal to the longitudinal axis of the meat log with the elongate logs being fed to the blade on a slight downward incline. The blade cutting faces can be configured to direct the cut slices in the preferred manner. In this regard, the slices cut from the end of the log need to undergo a reorientation as they free-fall and come to rest on the conveyor surface or another slice in the stack from their orientation when part of a log. Of course, this renders precise control over these slices extremely difficult and generally produces misshapen stacks such as those having accordion shapes where the individual adjacent slices in the stack are offset from one another in the lateral direction, skewed stacks, tipped over stacks, as well as other slice defects. Where workers observe that the frequency of the misshapen, or tipped over stacks are increasing, the line has to be shutdown so that the process parameters causing the stacking problem can be identified and corrected. Such parameters include temperature of the meat, sharpness of the cutting blade, equipment setup, and the like. As is apparent, this type of line shutdown reduces slice yield, lowers throughput and decreases worker productivity. Moreover, misshapen stacks can also cause efficiency problems in terms of the speed at which a worker can manually place a stack into the package compartment and can create a less than desirable presentation in the packages due to the presence of sloppy stacks therein.

Accordingly, there is a need for a system and method for placing sliced food stacks, i.e. sliced luncheon meat, into packages that limits the need for manual handling of the stacks of luncheon meat slices. Further, a system and method for slicing meat into stacks and placing the stacks of sliced meat in packages is needed that can increase worker productivity and generate faster throughput.

SUMMARY OF THE INVENTION

In accordance with the present invention, an automated system and method for slicing a meat product formed into stacks and placing the stacked slices into packages is provided. In the preferred form, after a log of meat is loaded into an initial upstream slicing station, the sliced stacks of meat are generated and packaged without the need for manual handling thereof unlike the previously described meat processing system where workers manually picked up and placed the sliced meat stacks into the package compartments. To this end, the meat log is sliced into smaller sections or chubs which are then, in turn, sliced into the individual meat slices for automated placement into the package compartment. By utilizing an extra slicing operation for forming a chub of meat that corresponds to the amount of meat to be placed into the package, there can be achieved greater control over the subsequent slicing action performed on the chub in terms of maintaining the slices in a stacked form thereof so that well-formed stacks of sliced meat products are generated. In other words, the chub has an outer configuration which in the illustrated form is a short cylindrical section of the log that matches the outer configuration of the sliced meat stack generated from the log. The cut slices do not undergo a free-falling action and the attendant difficulties this creates in achieving uniform stacks of sliced meat products as in the prior process. In contrast, the present system and method's use of two slicing stages allows for the production of well-formed stacks of sliced meat products that are substantially uniform in configuration from one stack to the next. In this regard, it is preferred that the chubs be oriented vertically so that they are lying flat with one of their cut faces against a support surface when they are sliced, as described hereinafter.

These uniformly, well-formed stacks of meat slices allow for the automated transfer of the stacks into the package compartment to take place without handling by workers, as mentioned above. The well-formed nature of these stacks enables the automated transfer to take place with a highly controlled guiding action as the stacks can be transferred, preferably by a vertical free-fall into packages therebelow. Accordingly, the present system and method significantly reduces the possibilities of introducing contamination to the meat slices due to handling thereof. In addition, the system and method herein can increase productivity by achieving faster throughput, improved yields, and lower maintenance and labor costs.

In a preferred form of the invention, an automated system for slicing meat and placing the sliced meat in stacks into a package therefor is provided. This system includes a slicing station having a chub slicer for slicing a chub of predetermined size from a log of meat fed to the slicer. The predetermined chub size substantially corresponds to a predetermined amount of meat to be placed in a compartment of the package. A chub slicing or harping station includes spaced harping blades and a chub advancement mechanism. The harping station receives chubs from the slicing station with the chubs pushed past the blades with a predetermined amount of force via the chub advancement mechanism to form a predetermined number of stacked meat slices from the chub. A stack insertion station receives the stacked meat slices from the harping station and includes a stack guide that maintains control over the stack of meat slices for automated transfer thereof into the package compartment. As is apparent, the above system substantially eliminates the need for workers to place stacks of meat slices into packages as it creates well-formed stacks of meat slices by cutting the chub from the meat log and then slicing it via the harping blades at the harping station which avoids having the slices undergo a free-falling action after they are cut from the log as in the prior process and method. With the stack of meat slices well-formed via the slicing and chub harping stations, the stack insertion station can automatically transfer the stack into the package compartment while maintaining control thereover in a simple and effective manner.

The chub slicer of the slicing station preferably includes a cutting assembly that supports the log on either side of a narrow slot through which a rotary cutting blade passes for slicing a chub of predetermined size from the meat log. In this manner, the meat log is not cantilevered from the support which can cause drooping and misshapen cuts as opposed to the desired planar cut end-face that is substantially normal to the longitudinal axis of the log. It is preferred that the rotary blade have substantially parallel planar cutting surface portions that pass through the log in the area aligned with the slot to further enable substantially flat end-faces to be formed on the cut chub. With the present chub slicer, the slices at the end of the chub including the end faces thereof will be of a high quality, i.e. with flat, parallel opposite faces, similar to the intermediate slices therebetween.

In a preferred form, the harping blades include a drive and blade mount assembly that cooperate so that the blades can undergo reciprocating movement. More specifically, the harping blades have an elongate flat configuration with a cutting edge along one edge against which the chub is pushed via the chub advancement mechanism, and the drive causes the blades to undergo reciprocating movement in the lengthwise direction thereof transverse to the pushing of the chubs. The reciprocating movement produces a slicing action on the chubs so as to minimize the force by which the advancement mechanism must push the chub through the blades. Accordingly, the likelihood of the blades deflecting as the chub is pushed thereagainst is reduced for forming high quality slices of meat.

Where the stack is in its preferred vertical orientation at the stack insertion station, the stack guide can include a weight that is engaged against the topmost slice in the stack. Thus, when the package is aligned with the stack, a gating mechanism at the insertion station can be actuated to shift from its support position to a release position which allows the stack with the guide weight thereagainst to fall into the aligned package therebelow. In this manner, the present system provides a controlled free-fall to a well-formed stacked of meat slices with the guide weight bearing against the upper slice to keep the stack in vertical alignment so that the stack drops in centered into the compartment clearing the sidewalls thereof. Thus, the present system avoids having individual slices that are airborne and fall into a stack which can create significant variations in the form of the stack from one stack to the next absent high-precision control over the various process parameters that affect the trajectory of the slices cut from the log. Further, there is no manual handling of the stack of slices for placement into the compartment as in the prior process.

In another aspect of the invention, an automated processing method for a meat product is provided including cutting a section of the meat product from a larger section thereof, the section corresponding to a predetermined amount of the meat product to be placed in a package, slicing the section into a predetermined number of slices that are formed simultaneously in a single slicing operation so that a stack of the slices is formed, aligning the package with the stack of slices for receipt in the package, and shifting the stack of slices automatically into the aligned package to avoid manual handling of the stack.

BRIEF DESCRIPTION OF THE DRAWINGS

FIG. 8 is a front-elevational view of the rotary cutting blade for the chub slicer;

FIG. 9 is a side-elevational view of the cutting blade showing opposite substantially parallel planar cutting surface portions of the blade;

FIG. 10 is a cross-sectional view of a portion of the rotary blade taken along line 10—10 of FIG. 8;

DETAILED DESCRIPTION OF THE PREFERRED EMBODIMENTS

Figure 1:
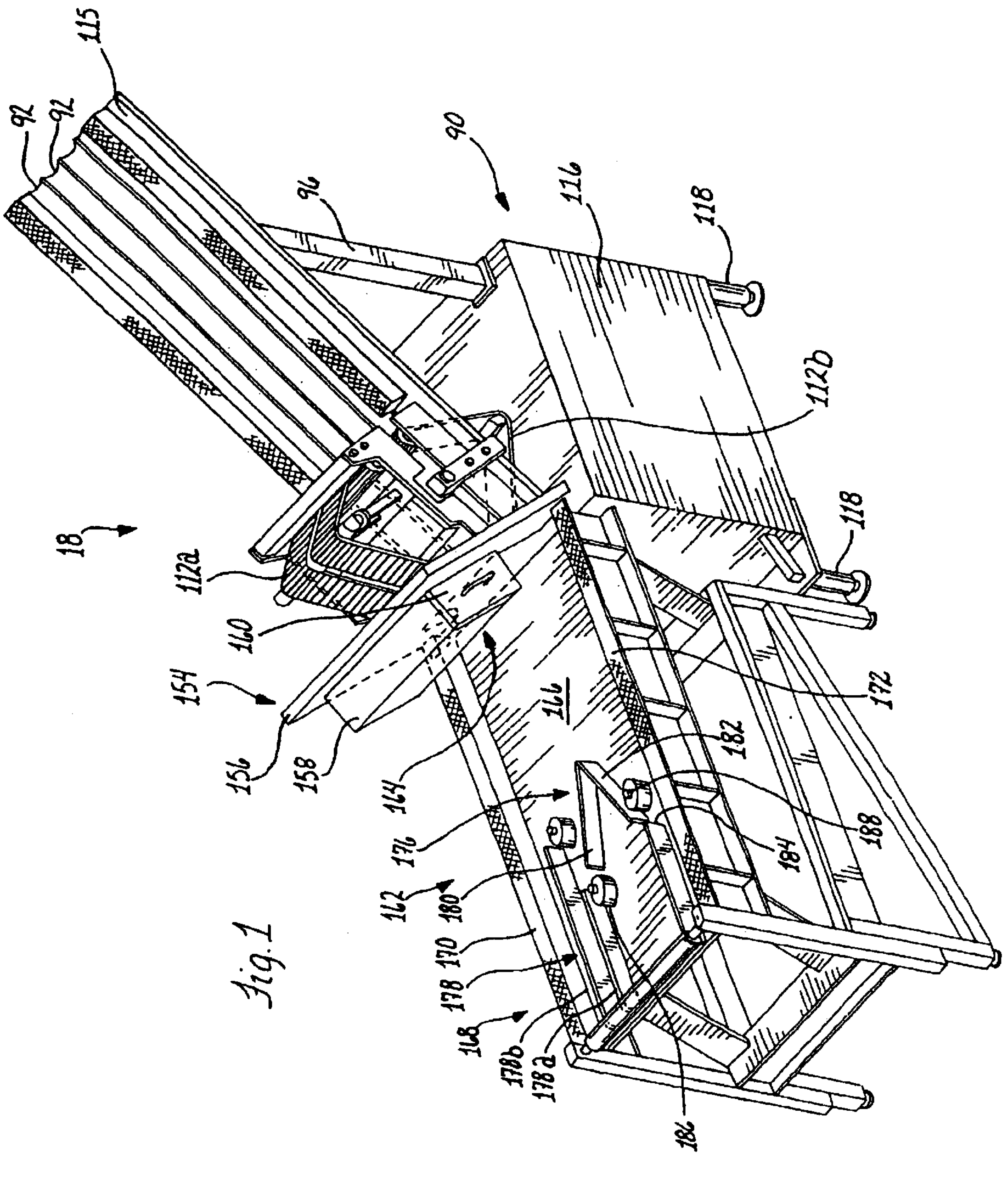
FIG. 1 is a perspective view of a slicing station for forming chubs from a log of meat, and a vibratory conveyor for transporting the chubs for further processing in accordance with the present invention.
Figure 15:
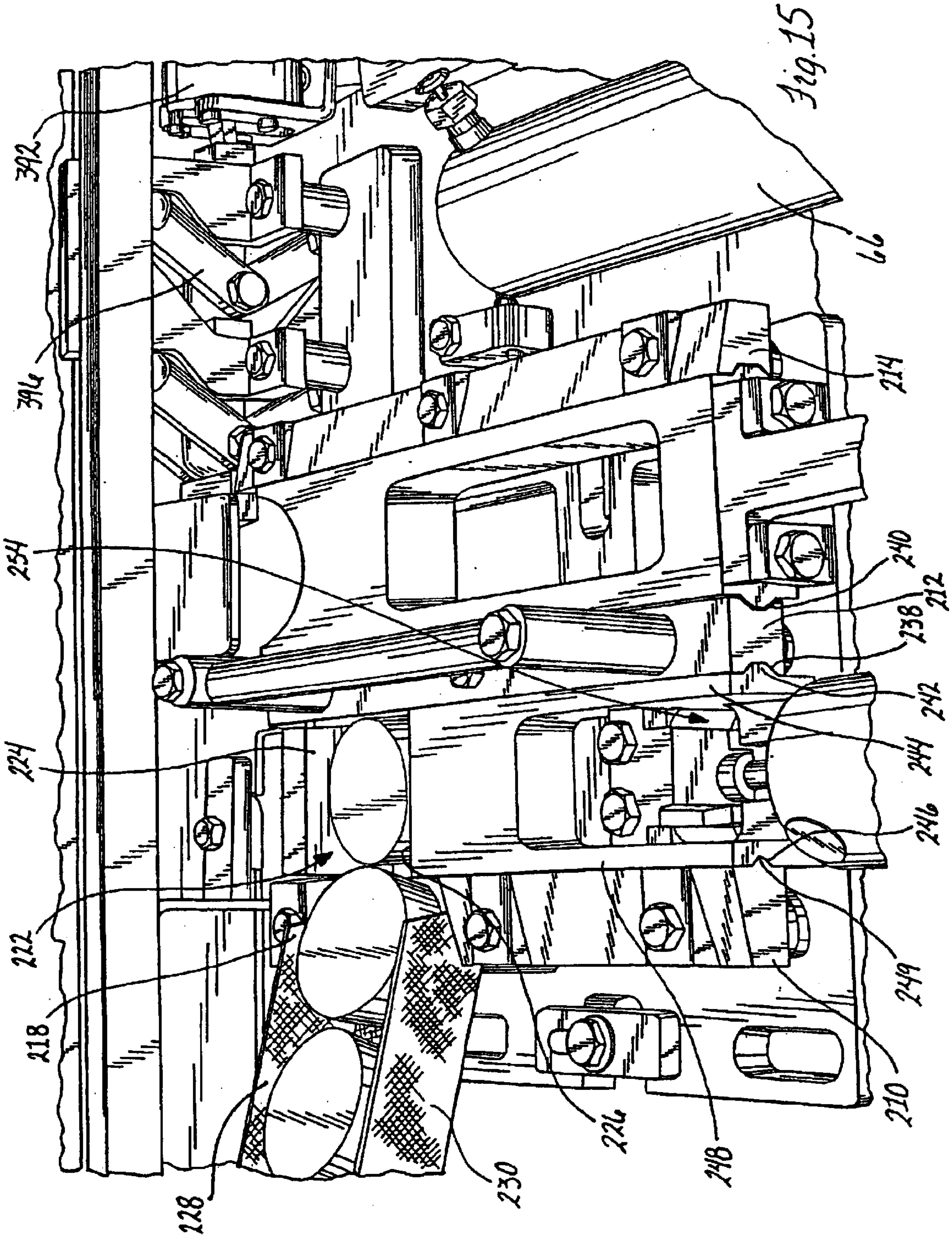
FIGS. 15–18 are color photographic views of the operating unit showing sequential operations of a slide member and paddle member for indexing the chub into alignment with a pusher member of the chub advancement mechanism.
Figure 32:
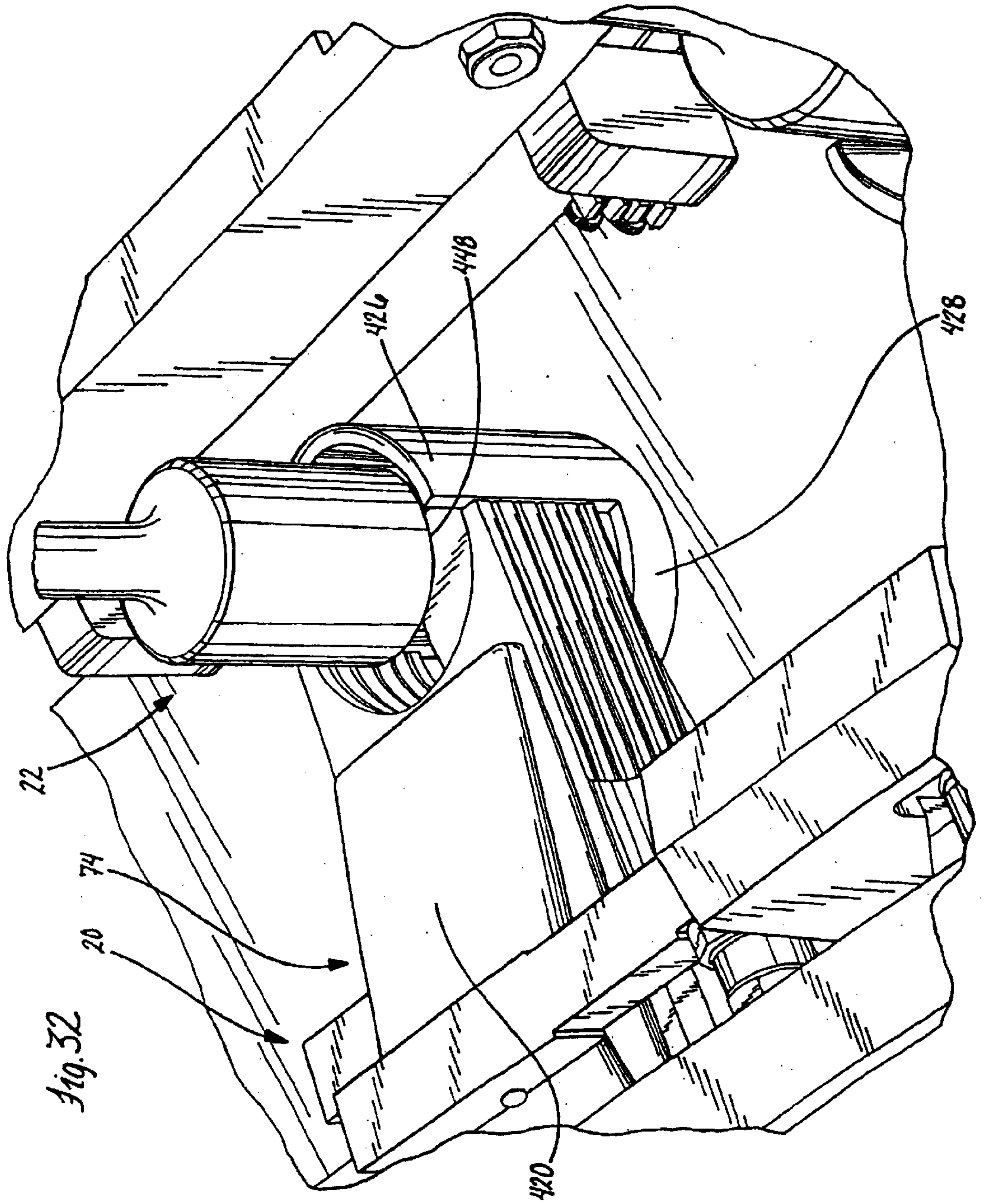
Figure 38:
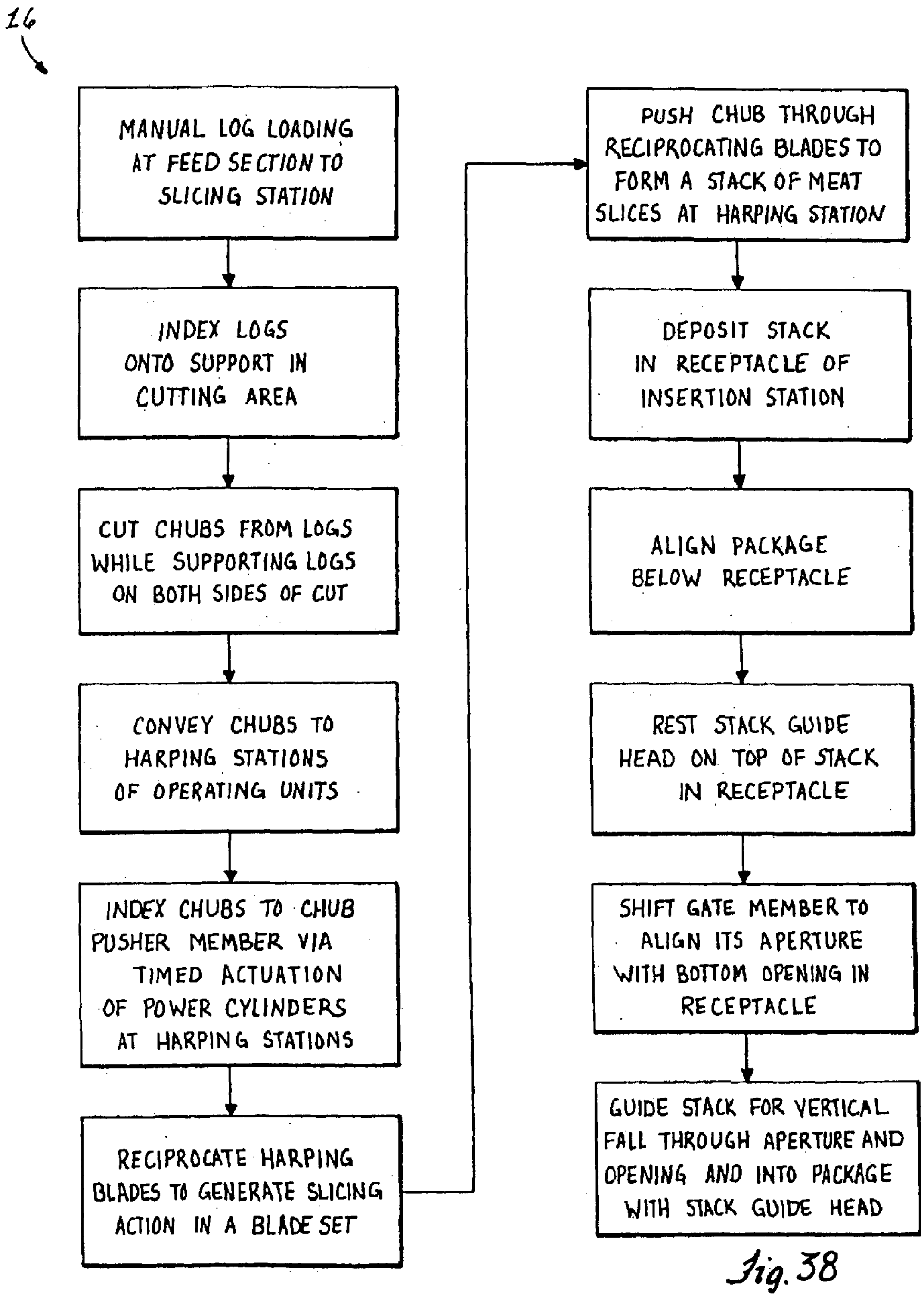
FIG. 38 is a flow diagram of the method of operation of the present system for generating chubs from meat logs and stacks of meat slices from the chubs that are deposited into packages therefor.

In FIGS. 1, 15 and 32, the various stations for cutting and slicing of a food product 10, e.g. precooked luncheon meats, into stacks and for automated placement thereof in packages 14 are shown. FIG. 38 shows the method of operation at the various stations to provide an automated system 16 that slices the luncheon meat 10, generates well-formed stacks 12 of the sliced meat 10, and automatically transfers the well-formed stacks 12 into the packages 14 avoiding manual handling of the meat 10 at each of the operating stations.

More specifically, the stations include a slicing station 18, and a chub harping station 20 and stack insertion station 22 adjacent to each other, as can be seen in FIG. 32. After a worker loads meat logs 24 into feed section 26 at the slicing station 18, handling by the workers of the meat 10 ceases and is no longer required as the meat logs 24 are cut into chubs 26 that correspond to the predetermined amount of meat to be placed in an individual package 14, and specifically a particular compartment 28 thereof. Thereafter the chubs 26 are transported to the harping station 20 where they are sliced into well-formed stacks 12 of a predetermined number of meat slices 30 that enable automated transfer thereof into the package compartments 28, as will be more fully described hereinafter.

As mentioned, the present system 16 cuts the logs 24 into chubs 26 prior to forming slices 30 of the meat product with the size of the chubs 26 corresponding to the predetermined amount of meat that is to be placed into the package compartment 28. Where the package 14 includes other compartments 32 for other ready-to-eat food products, the system 16 herein is well adapted for use with the Lunchables® product line of the assignee herein. In this regard, other food items in addition to the sliced meat product 10 herein can include a farinaceous food, one or more sauces or dips, and a confectionary or desert food, some of which may be prepackaged for placement in the other compartments 32. Examples of farinaceous foods include breadsticks, pizza crust, nacho chips and the like. Examples of sauces or dips include cheese sauce, salsa, pizza sauce and the like. Examples of desert foods include candy pieces, cookies and the like. In addition to the precooked meat product 10, shredded cheese or other cheese products can also be included in the meal kit. If desired, other components can also be included in the meal kit, such as utensils or other implements to assist with assembling the food items, spices, napkins and the like.

Returning to the description of the system 16 herein, by forming the chubs 26, the subsequent slicing operation conducted at the harping station 20 can be much more controlled in terms of how the stacks 12 are formed as instead of individual slices coming off of the logs 24 of meat 10, the slices 30 of a particular stack 12 are all formed simultaneously in a single cutting operation at the harping station 20 so that the sliced stacks 12 of meat slices 30 substantially retain the same configuration as that of the chubs 26. As shown, the chubs 26 preferably have substantially parallel flat end-faces 34 and 36 with a cylindrical outer surface 38 extending therebetween. In this regard, the logs 24 also include a cylindrical outer surface thereof; however, it is also contemplated that the logs 24 and the chubs 26 cut therefrom can have a different outer configuration such as a polygonal configuration while not departing from the invention herein.

In forming the chubs 26, it is important that the cut end-faces 34 and 36 be well-formed, i.e. flat and parallel, so that the slices 30 formed from the chubs 26 are likewise well-formed. For this purpose, chub slicing assembly 40 at the slicing station 18 includes a log support 42 on which the logs 24 rest on either side of cutting area 44 through which cutting blade 46 passes. In this manner, the logs 24 are substantially fully supported on both sides of the cutting area 44 so that as the blade 46 cuts the logs 24, there will be no pulling of the chubs 26 before they are fully severed from the logs 24 as could occur if the logs were not supported on the downstream side of the cutting area 44. In other words, if the logs 24 were simply left to hang downstream of the cutting area 44, it has been found that such cantilevered logs 44 will droop and cause misshapen or other than planar cut end-faces 34 and 36 to result.

Another contributing factor to having the desired planar faces 34 and 36 of the chubs 26 is the configuration of the cutting blade 46 itself. In this respect, the cutting blade 46 is preferably of the rotary type having a plate-like form with a circular outer configuration and a central hub assembly 47 including a through aperture 48 formed therein, as best seen in FIGS. 8–10. The hub assembly 48 is mounted to an eccentric shaft of a blade drive motor offset from the axis of the rotary output generated thereby so that the rotary blade 46 undergoes an eccentric, orbital motion with the cutting area 44 lying in the orbital path through which it travels during slicing operations.

The configuration of the cutting blade 46 is generally flat in that it includes substantially parallel planar cutting surface portion 50 and 52 on opposite faces 46*a* and 46*b* of the blade 46, as can best be seen in FIG. 9. Unlike prior blades having contoured cutting faces that can impart a desired motion to the cut product as the blade passes therethrough, the present blade with the opposite parallel flat cutting surface portions 50 and 52 will pass through the logs 24 and will push the cut surfaces equally away from each other, thus ensuring that the blade 46 does not impart any contour to the cut faces 34 and 36 of the chubs 26 that is other than planar as is desired. Accordingly, with the combination of the log support 42 that spans the cutting area 44 and the flat configuration of the cutting blade 46, the chubs 26 formed in the slicing station 18 will have the desired flat, parallel end-faces 34 and 36 which, in turn, leads to the high quality of the meat slices 30 in the subsequent slicing operation, as described hereinafter.

After the chubs 26 are formed at the slicing station 18, they are transported to the harping station 20. At the harping station 20, the chubs 26 are received in a staging area 54, that is preferably sized to receive a single one of the chubs 26, as shown in FIGS. 13–16. With the chub 26 in the staging area 54, it is then shifted into alignment with a chub advancing mechanism 56, as will be described more fully hereinafter. The chub advancing mechanism 56 is then operable to push the chubs 26 through a set of harping blades 58, as can be seen in FIGS. 19 and 29–31.

Figure 20:
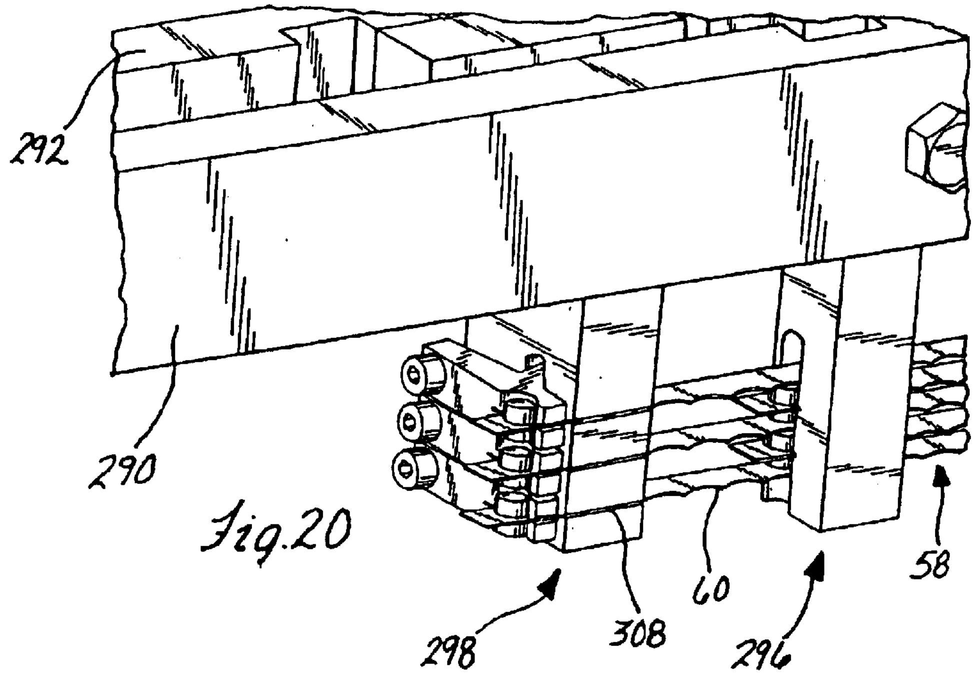

Referring to FIG. 20, generally the harping blades 58 have a flat, elongate configuration having one of the edges 60 thereof serrated, and against which the chubs 26 are pushed. The harping blades 58 are shown in their preferred form as extending horizontally such that the chub 26 is preferably oriented in a vertical fashion with one of the end-faces 34 and 36 thereof resting on a support surface as the chub 26 is pushed through the harping blades 58. As can best be seen in FIGS. 13, 29, 30 and 32, the chub advancing mechanism 56 preferably includes a arcuate engagement end portion 62 for bearing against the chub cylindrical outer surface 38 as it is pushed through the harping blades 58. In addition, the advancing mechanism 56 is slotted at the end portion 62 to provide clearance for the harping blades 58 as the chub 26 is pushed therethrough. The arcuate engagement end 62 preferably extends for substantially the full height of the chub outer surface 38 between the ends 34 and 36 thereof and has a curvature that extends for approximately 180 degrees about the chub outer surface 38 so that it securely engages and centers with the chub 26 to push it through the harping blades 58.

In the illustrated and preferred form, there are five harping blades 58 vertically equally spaced from each other so as to generate six slices 30 from the chub 26 when pushed therethrough. As is apparent, the slicing operation performed by the harping blades 58 causes the slices 30 to be formed simultaneously from a single one of the chubs 26. As has been discussed, this eliminates the free-falling of meat slices as occurred in the prior process, and thus better generates on a consistent basis slices 30 that are in well-formed stacks 12 which substantially matches the cylindrical outer configuration of the chubs 26 themselves.

Figure 13:
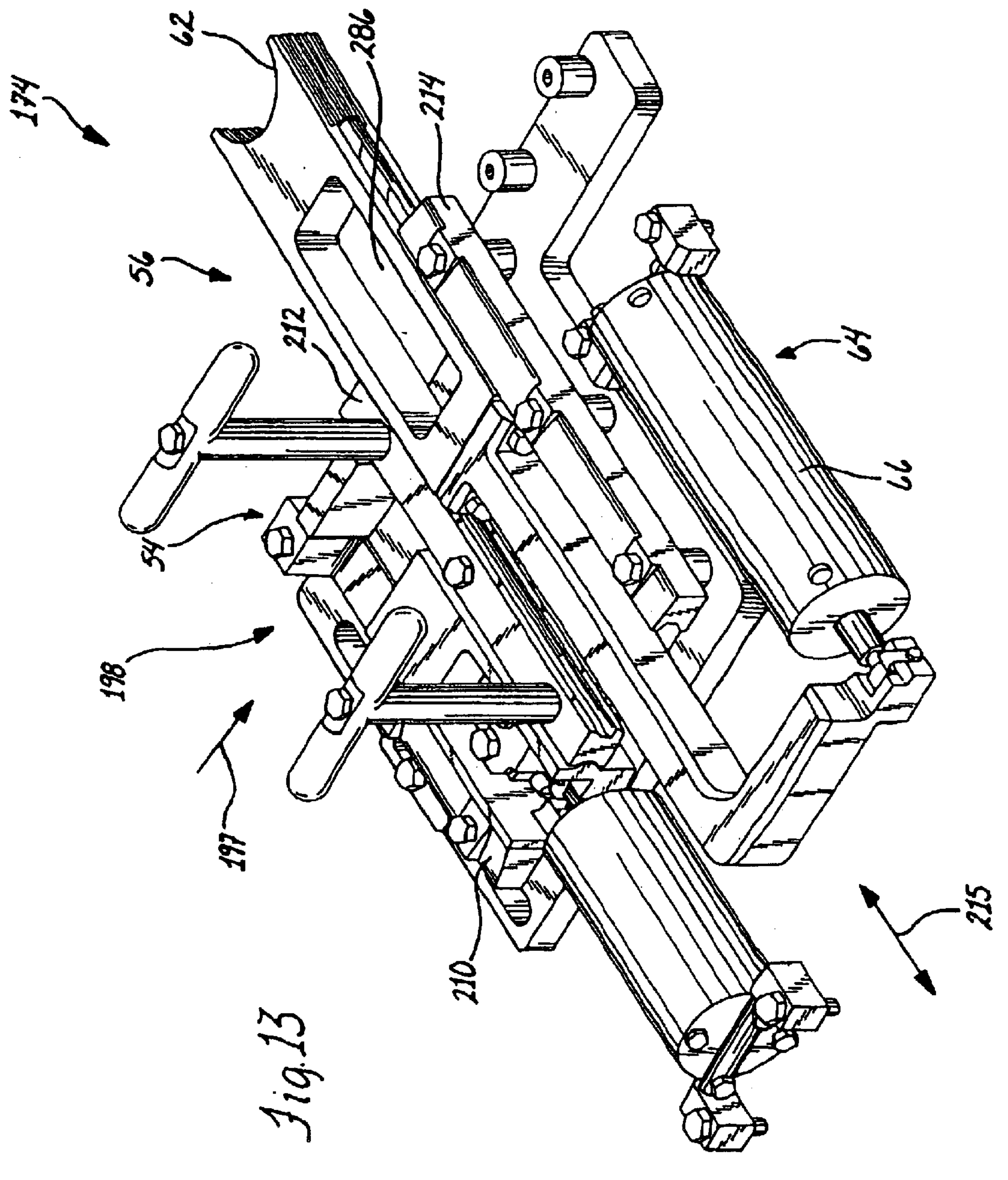
FIG. 13 is a color schematic perspective view of one of the operating units on the table showing a staging area for the chubs and a chub advancement mechanism for pushing the chubs for slicing thereof.

For pushing the chubs 26 through the harping blades 58, the advancing mechanism 56 includes a power actuator 64 that causes the engagement end 62 to push on the chub 26 with a predetermined amount of force. In a preferred form, the actuator 64 is a power cylinder 66 which when actuated causes the engagement end 62 to shift toward the harping blades 58, as shown in FIG. 13. The cylinder 66 includes a regulator 67 that limits the amount of force applied by the engagement end 62 to the chubs 26. In this manner, the force with which the chubs 26 will engage the harping blades 58 can be precisely controlled so as to avoid deflecting the blades 58 which can potentially cause misshapen meat slices 30 to be formed from the chub 26.

It is preferred that the harping blades 58 undergo reciprocating motion, preferably along their lengthwise extent. In this regard, a drive 68 and a blade mount assembly 70 are provided (FIGS. 19–27) that cooperate to produce the reciprocating action of the harping blades 58. As can best be seen in FIGS. 24–26, the drive preferably is an eccentric blade drive 68 for generating the oscillating or reciprocating movements of the harping blades 58. To this end, a pivotal actuator 72 is connected between the drive 68 and the blade mount 70. The pivotal actuator 72 is operable to translate the rotary, eccentric motion of the drive 68 to a reciprocating movement of the harping blades 58 via the blade mount assembly 70, as described further hereinafter. Thus, as the eccentric drive 68 rotates, the pivotal actuator 72 will alternatively pull and push on portions of the blade mount assembly 70 to generate reciprocation of the harping blades 58. The reciprocating action of the blades 58 enables the output force from the power cylinder 66 to be kept to a minimum while still achieving well-formed slices 30 from the chub 26. To this end, it is found that a regulated force of approximately 10 psi in the cylinder 66 is sufficient to cause the chub 26 to be pushed with the desired force via the chub advancing mechanism 56 for slicing the chub 26 with the reciprocating harping blades 58 into well-formed meat slices 30. At this low force level, the blades 58 are less likely to deflect or wander such as in an up and down fashion that could cause wavy or other than planar cut faces on the meat slices 30.

As previously mentioned, the harping station 20 and insertion station 22 are preferably closely adjacent to each other, as shown in FIG. 32. In this manner, the chub advancing mechanism 56 can be utilized to transfer the sliced chubs 26 from the harping station 20 to the insertion station 22 adjacent thereto. In the preferred and illustrated form, a chub centering mechanism 74 is generally disposed at the harping station 20 and preferably extending to the insertion station 22, as will be described more fully hereinafter. The centering mechanism 74 includes opposing upper and lower members 76 and 78 between which the chub 26 is advanced by the chub advancing mechanism 56. The members 76 and 78 are biased toward one another so as to engage the chub faces 34 and 36, respectively, with equal and opposite force. The centering mechanism 74 is arranged so that the mid-point between the upper and lower members 76 and 78 corresponds to the vertical mid-point of the set of harping blades 58. Thus; the centering mechanism 74 keeps the vertical center of the chub 26 aligned with that of the set of harping blades 58 thus ensuring that the top and bottom slices including respective end-faces 34 and 36 are of substantially equal thickness despite potential variations in the height of the cylindrical outer surface 38 of the chub 26 between the end-faces 34 and 36 thereof. Accordingly, at a minimum, with the chub centering mechanism 74, the top and bottom slices in the stack 12 will be of equal thickness and the intermediate slices, there being four such slices where there are five harping blades 58, will be of equal thickness based on the equal spacing between the blades 58. By way of example and not limitation, with the Lunchables® product line, the thickness of the intermediate meat slices can be approximately 0.120 inch with the small sized luncheon meat of approximately 1.75 inches in diameter. The height of the stack 12 will be approximately 0.875 inch with slight variations therefrom due to any variations in the height of the chub 26 that might be produced at the slicing station 18.

Figure 11:
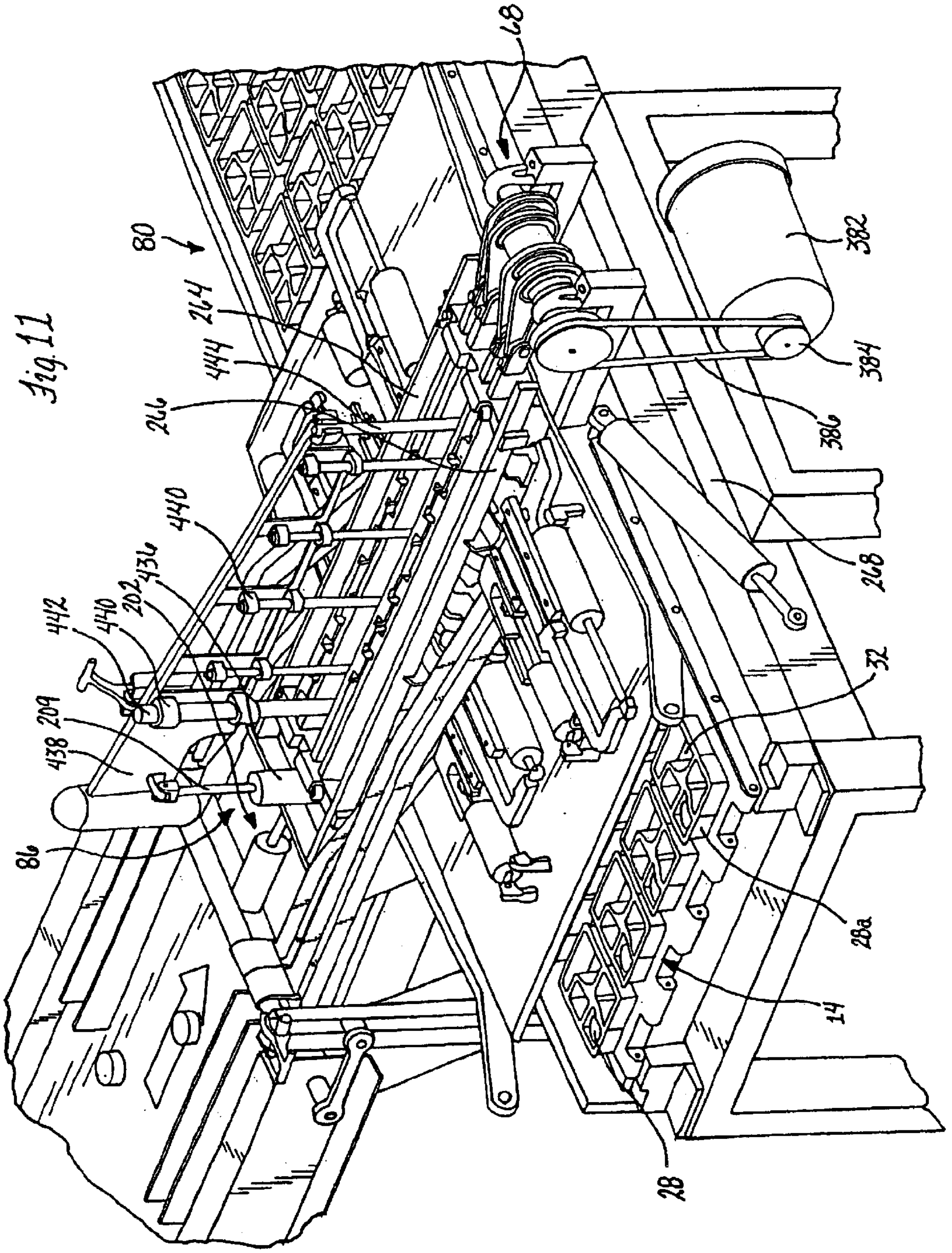
FIGS. 11 and 12 are color schematic perspective views of a table that receives chubs from the chub conveyor for further processing into stacks of slices for placement into compartments of trays on a conveyor traveling below the table.
Figure 12:
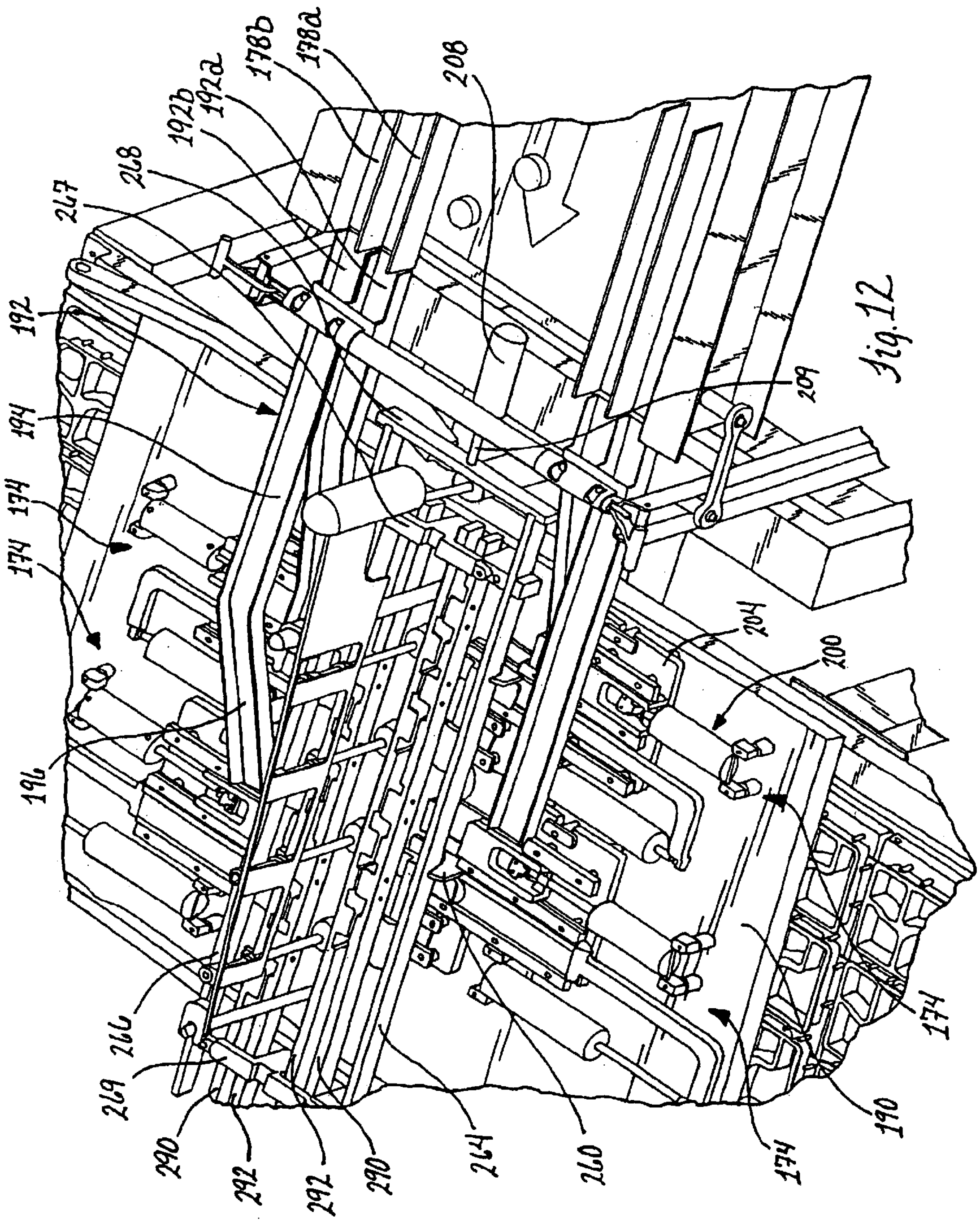

After the chub 26 has been sliced by being pushed through the harping blades 58 and between the chub centering mechanism members 76 and 78 with the chub advancing mechanism 56, the stack 12 of meat slices 30 15 slides out from between the members 76 and 78 into the insertion station 22. A conveyor 80 brings the packages 14 to the insertion station 22 for automatically being filled with stacks 12 of meat slices 30, as can be seen in FIGS. 11 and 12. The conveyor is preferably an indexing conveyor 80 that aligns the packages 14, and specifically the compartment 28 thereof designated for receipt of the stack 12 of meat slices 30, with the stacks 12. In this regard and as shown in FIGS. 33–37, a stack gating mechanism 82 is disposed between the stack 12 and the aligned packages 14. With the stacks 12 in their preferred vertical configuration after having the chubs 26 sliced at the harping station 20, the package delivery conveyor 80 will run below the gating mechanism 82. Accordingly, the gating mechanism 82 has a support position which allows the advancing mechanism 56 to slide the stack 12 off of the lower member 78 of the centering mechanism 74 with the lowest slice in the stack 12 including one of the end-faces 34 and 36 engaged flush on the gating mechanism 82. Once the package conveyor 80 has brought the package compartment 32 into alignment with the stack 12, the gating mechanism 82 shifts to its release position which allows the stack 12 to fall into the aligned compartment 28. Thus, the insertion station 18 receives very tight, well-formed stacks 12 of meat slices 30 from the harping station 20 and automatically transfers them into the package compartments 28 therefor without the need for handling of the meat stacks 12.

To ensure that the stacks 12 are properly transferred into the package 14 while maintaining their well-formed configuration as previously described, a stack guide 84 is provided at the insertion station 22. During transfer of the stack 12, the guide 84 can engage against one of the end faces 34 or 36 of the stack 12 for pushing the stack 12 into the aligned package compartment 28 while maintaining the substantial well-formed cylindrical outer configuration thereof. With the stack 12 in its preferred vertical orientation with one end 34 or 36 resting on the gating mechanism 82 as previously described, an actuator 86 for the guide 84 is operable to shift a weighted engagement head 88 to bear against the other of the stack end faces 34 or 36 which faces upwardly toward the head 88. Thus, when the gating mechanism 82 is shifted to its release position, the stack 12 will fall into the compartment 28 with the weighted head 88 engaged thereagainst to undergo a free-falling action therewith. With the weighted head 88 of the guide 84 falling vertically under the influence of gravity, there is less likelihood that the meat slices 30 in the stack 12 will lose their desired configuration in the stack 12 during this transfer into the compartment 28. Accordingly, the stack guide 84 keeps control over the free-falling stack 12 of meat slices 30 so that they fall properly into the aligned package compartment 28 therebelow minimizing the instances of having the slices 30 in the stack tilting or shifting out therefrom and/or engaging a compartment wall or the like during the transfer. In this manner, the system 16 and method herein generally provides an improved presentation of the meat stacks 12 in the packages 14 over stacks that are manually placed therein with the prior process where the stacks are more likely to be misshapen, as previously described.

Accordingly, the present system 16 and method allow meat logs 24 to be manually loaded into the slicing station 18 and thereafter be continuously automatically processed at the stations 18, 20 and 22 for automated placement into packages therefor without the need for handling of the meat stacks 12 by workers. To this end, the slicing station 18 is effective to form smaller sections or chubs 26 from the meat logs 24 and to do so such that the chubs 26 are provided with substantially parallel flat end-faces 34 and 36 to ensure that high quality meat slices 30 are generated therefrom. The chubs 26 are then transported to the harping station 20 where each of the chubs 26 undergoes a single cutting operation, thus simultaneously forming the meat slices 30 therefrom and substantially maintaining the slices 30 in the configuration of the chubs 26 for generating well-formed stacks 12 of the slices 30. Thereafter, the stacks 12 are received at the insertion station 22 where they are transferred to their packages 14, on an automated basis without the need for manual handling thereof. This is enabled due to the well-formed stacks 12 generated by the harping station 20 which allows the stacks 12 to be dropped into the packages 14 aligned therebelow.

Figure 2:
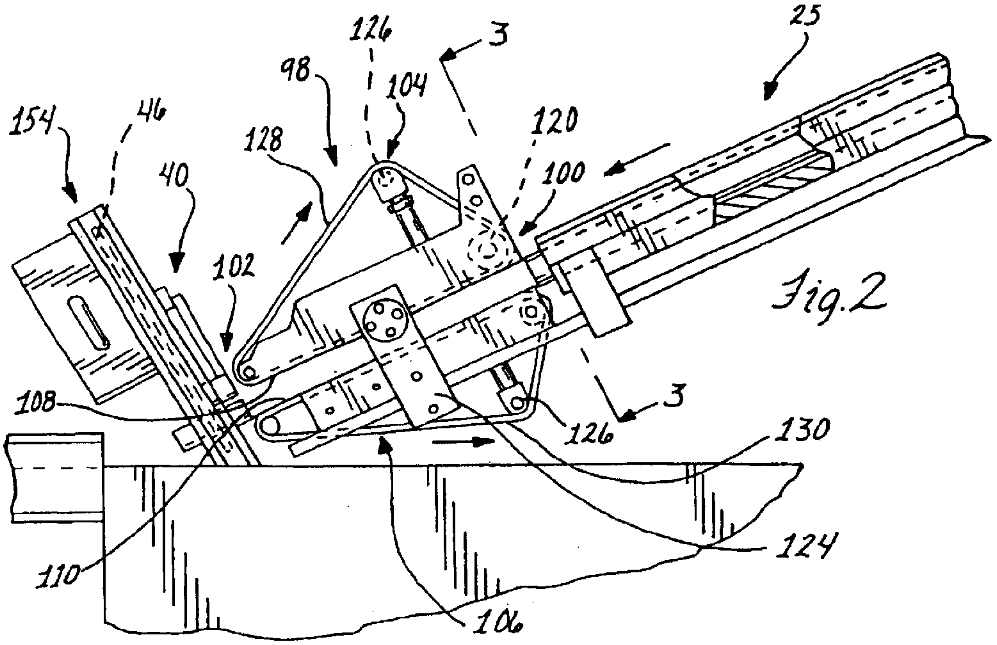
FIG. 2 is a side-elevational view of an indexing feed mechanism and a chub slicing assembly adjacent outlet of the feed mechanism in the slicing station.
Figure 3:
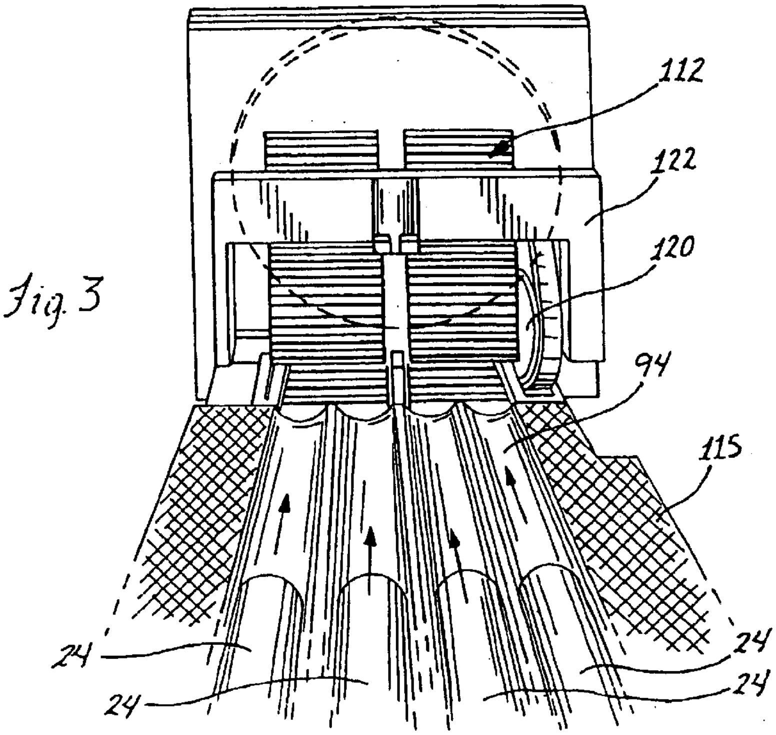
FIG. 3 is a elevational view taken along line 3—3 of FIG. 2 showing meat logs placed in support channels leading to inlet of the feed indexing mechanism.

Turning next to more of the details and referencing FIGS. 1–7 to describe the slicing station 18 and, more particularly, the feed section 25 and the chub slicing assembly 40 thereat, a frame 90 is provided to support the feed section 25 and the chub slicing assembly 40. The feed section 25 includes a plurality of channels 92 into which the meat logs 24 fit for being manually loaded therein. The channels 92 can have an upwardly facing concave surface 94 which generally matches the outer cylindrical contour of the logs 24, as best seen in FIG. 3. The channels 92 are oriented at a downward incline via support leg 96 of the frame 90 so that the logs 24 are fed downwardly toward the slicing assembly 40.

Figure 6:
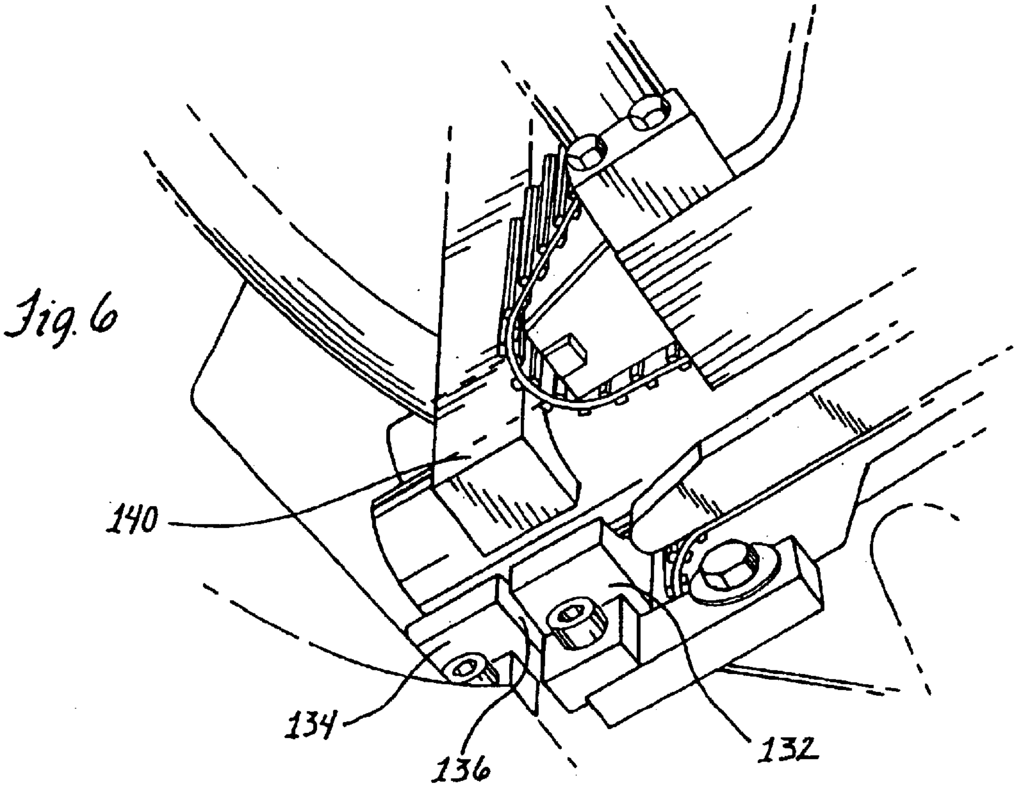
FIG. 6 is a perspective view of the outlet of the indexing mechanism and the chub slicing assembly showing the rotary blade as it passes through the slot to cut chubs from the logs at the slicing station.
Figure 7:
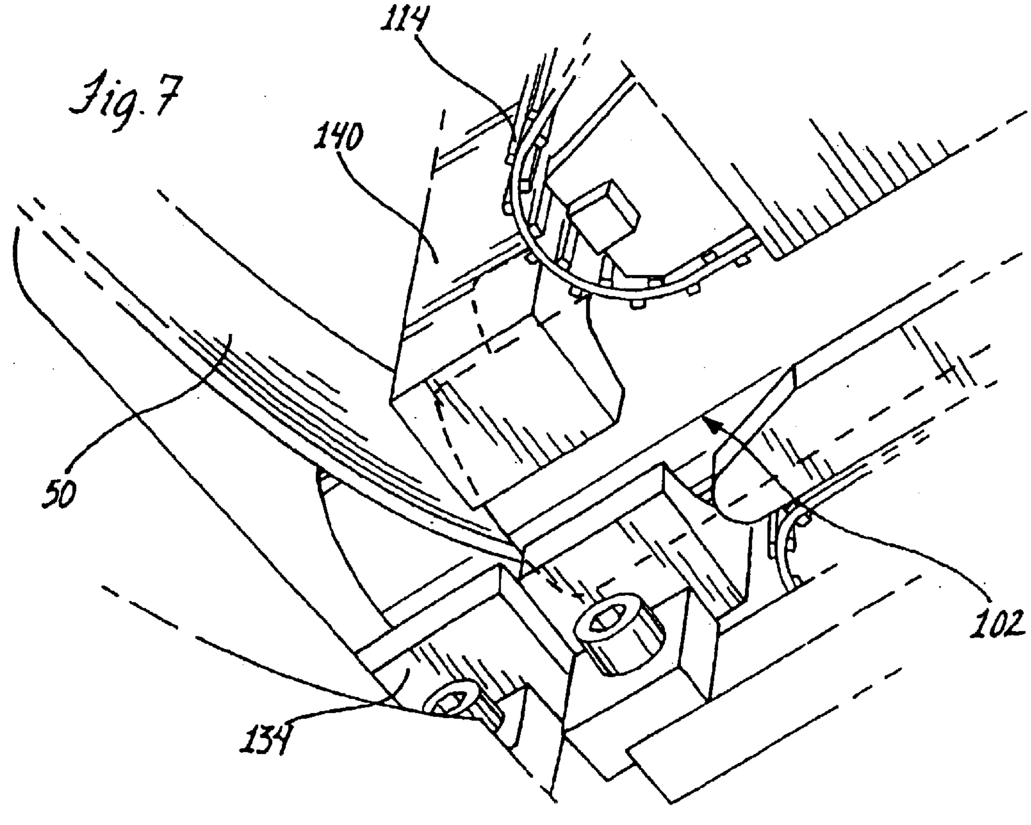
FIG. 7 is an enlarged perspective view similar to FIG. 6 showing the progression of the rotary blade so as to cut all of the chubs from the logs in a single pass of the blade through the slot of the support.

At the lowermost end of the channels 92, an indexing feed mechanism 98 is provided for controlled feeding of the logs 96 to the slicing assembly 40. Accordingly, inlet end 100 of the feed mechanism 98 is adjacent the lower end of the channels 92 and outlet end 102 of the feed mechanism 98 is adjacent the slicing assembly 40. The indexing mechanism 98 can include upper and lower belt assemblies 104 and 106 which cooperate to securely grip the logs 96 for advancing them by predetermined increments to the slicing assembly 40. In this regard, the upper belt assembly 104 includes a lower run 108 thereof that is in opposing substantially parallel relation to an upper run 110 of the lower belt assembly 106 for engaging the upper and lower portions of the logs 24 therebetween. To this end, the spacing between the parallel runs 108 and 110 is slightly less than the diameter of the logs 24 to ensure that there is no slippage of the logs 24 therebetween. In addition, the belt assemblies 104 and 106 can include traction belts 112 that have raised transversely extending ribs 114 thereon, as best seen in FIGS. 6 and 7. These ribs 114 securely grip the outer surface of the logs 24 without breaking through the surface or otherwise damaging the logs. 24. Accordingly, the belt assemblies 104 and 106 can provide the feed mechanism 98 with precision-indexed movements of the logs 94 to the slicing assembly 40 under command of a programmable logic controller (PLC) or the like so that the chubs 26 are formed with substantially the same axial length of their outer surface 38 between the ends 34 and 36 thereof from one slicing operation to the next.

In the preferred and illustrated form, the four channels 92 are provided on an incline table 115 supported by the frame leg 96. To raise the channels 92 to the desired height, a base box portion 116 of the frame 90 is supported raised off the floor adjacent the four corners thereof by lower adjustment legs 118 with the leg 96 extending from the upper surface of the box portion 116 to the table 115, as shown in FIG. 1. The four channels 92 lead to two pairs of upper and lower belts 112*a* and 112*b* with each belt pair operable to feed two logs 24 to the slicing assembly 40. The pairs of belts 112*a* and 112*b* are trained about rollers 120 rotatably mounted to a belt sub-frame 122 secured to the table 115 via mounting bars 124 on either side thereof.

The rollers 120 can include upper and lower tensioning rollers 126 that deflect upper and lower runs 128 and 130 of the belt assemblies 104 and 106, respectively. As best seen in FIG. 2, the upper deflection roller 126 causes the upper run 128 to travel back upstream from the outlet end 102 of the feed mechanism 98 at an upward angle and then back down toward the inlet end 100 of the indexing mechanism 98, and the lower deflection roller 126 causes the lower run 130 to travel back upstream from the indexing mechanism outlet end 102 at a downward angle and then back at an upward angle to the indexing mechanism inlet end 100. The tensioning rollers 126 are effective to remove slack that can build up in the belt assemblies 104 and 106 during their operation and cause less than precision movements of the logs 24 therewith.

Figure 4:
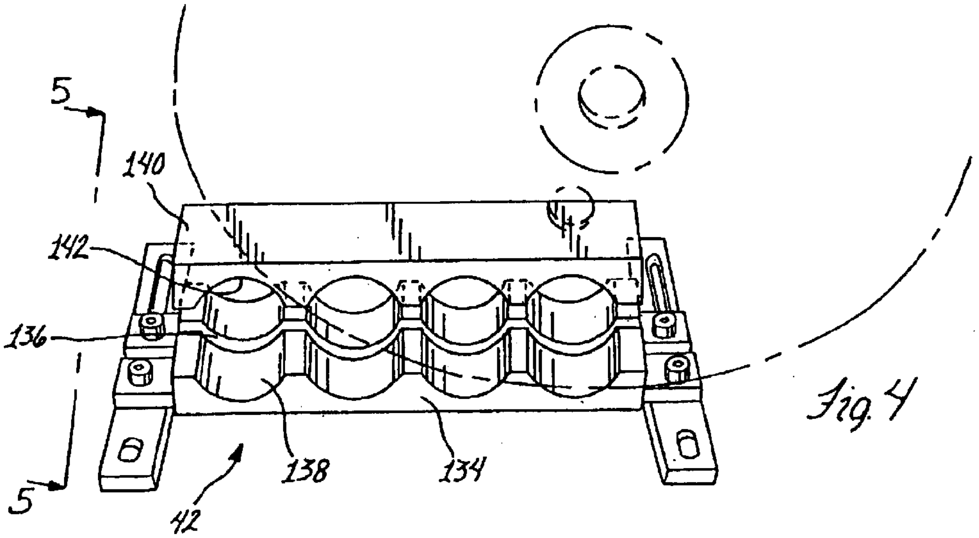
FIG. 4 is a perspective view of a log support showing a clearance slot for supporting the log thereacross and allowing a rotary blade, shown in phantom lines, to pass therethrough.

The chub slicing assembly 40 has a pair of lower support members 132 and 134 with the member 132 being upstream from member 134 and separated by a gap 136 therebetween defining the cutting area 44. The members 132 and 134 extend along their length transverse to the axial feed direction of the logs 24 along their longitudinal axis 24*a* so that the gap is in the form of an elongate, transverse slot 136 through which the blade 46 has clearance to pass. As best seen in FIG. 4, each of the support members 132 and 134 preferably include four upwardly facing concave surfaces 138 in alignment with the corresponding surfaces 94 of the channels 92 on the incline table 115. In addition, an upper guide member 140 is provided for cooperating with the upstream support member 132. The upper guide member 140 preferably includes four concave surfaces 142 facing downwardly toward corresponding concave surfaces 138 on the lower support member 132. As can be seen in FIGS. 6 and 7, the support members 132 and 140 are arranged closely adjacent the outlet end 102 of the indexing feed mechanism 98 so that as the logs 24 emerge from between the belt runs 108 and 110, they enter the area between facing concave surfaces 138 and 142 of the respective members 132 and 140.

As the logs 24 advance downstream, they are supported to straddle the gap or slot 136 by the downstream support member 134 until the chubs 26 are cut therefrom by the rotary blade 46. As previously mentioned, it has been found that the use of the downstream support member 134 is of particular importance in obtaining the desired planar cut end-faces 34 and 36 for the chubs 26 normal to the log axis 24*a*. The downstream support 134 keeps the end of the logs 24 from drooping or sagging downwardly and generating an other than planar cut on the end face 34 or 36 of the chubs 26.

Figure 5:
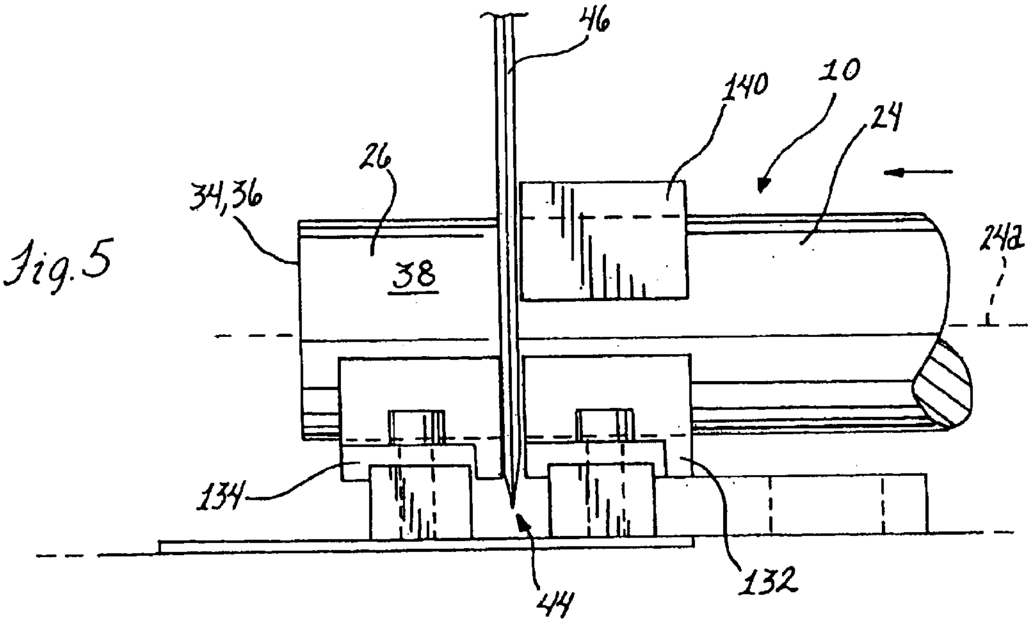
FIG. 5 is a side-elevational view taken along line 5—5 of FIG. 4 showing a log on the support spanning the slot and the blade cutting a chub from the log.

Accordingly, the downstream support member 134 is effective to keep the log 24 aligned along its longitudinal axis 24*a* during a cutting operation. The width of the slot 136 between the support members 132 and 134 is kept to a minimum while allowing the blade 46 to fit between the members 132 and 134 for slicing a chub 26 off of the end of a log 24, as best seen in FIGS. 5–7. In this manner, there is only a small portion of the log 24 that goes unsupported in the cutting area 44 by either of the members 132 or 134. The illustrated blade 46 can have a maximum thickness of 0.188 inch between faces 46*a* and 46*b* thereof with the slot width slightly larger to provide the blade 46 with clearance between the members 132 and 134.

In addition to keeping the log 24 supported on either side of the cutting area 44, another important consideration in achieving planar, parallel end-faces 34 and 36 on the chubs 26 is the configuration of the blade 46. As previously discussed, it is desired to have substantially planar, parallel cutting surface portions 50 and 52 on the blade faces 46*a* and 46*b*, respectively, so that the blade 46 itself does not cause any preferential movement of the log 24 either upstream or downstream along the axis 24*a*during a slicing operation. To this end, the blade 46 is preferably beveled at the outer, circular edge 144 thereof along both of the blade faces 46*a* and 46*b*. Thus, the blade 46 includes opposite tapered surface portions 146 and 148 at the outer edge of the respective faces 46*a* and 46*b* that meet at a sharp tip or point 150, as best seen in FIG. 10.

The blade 46 is mounted to its orbital shaft such that hub axis 47*a* is substantially parallel to log axis 24*a*. Accordingly, as the blade 46 rotates in its orbital path, the sharp point 150 at the blade peripheral edge 144 will pierce the logs 24 and then will progress therethrough with the meat 10 separating along the tapered surface portions 146 and 148 as the blade continues its penetration through the log 24. At the radially inward end of the tapered surface portions 146 and 148, the meat 10 is separated by the flat, parallel cutting surface portions 50 and 52. Accordingly, the rotary blade 46 herein generates equal and opposite forces on the cut meat 10 as it passes therethrough due to the generally symmetric configuration of the blade about the periphery thereof, including the double-bevel surfaces 146 and 148 leading to the parallel cutting surface portions 50 and 52. This blade design in conjunction with that of the log support 42 previously described, has been found to generate sliced chubs 26 from the logs 24 that have well-formed, substantially flat and parallel cut end-faces 34 and 36 thereon.

Continuing with reference to FIG. 10, it can be seen that the rotary blade 46 includes a recessed or dished area 152 radially inward from the flat cutting surface portion 50 on the blade face 46*a* facing in the upstream direction during a cutting operation. One problem that has been noted is that despite the relatively large, heavy construction of the blade, e.g. 15¾ inch diameter of stainless steel material, and the speed at which it driven, clean slicing of four meat logs 24 can be difficult to achieve. In other words, as the blade 46 is in cutting engagement with all four logs 24, there will be a large surface area on the blade faces 46*a* and 46*b* that is in contact with the meat 10. Depending on the type and consistency of the meat 10, this large surface area of engagement can cause the blade velocity to significantly slow and even cease up entirely generating less than clean slices and severing of chubs 26 from the logs 24 which, in turn, can create imprecision or other than planar cut end-faces 34 and 36 as is desired. In particular, on the upstream face 46*a* of the blade 46, the weight of the logs 24 less the end chub portions downstream therefrom will be pushed thereagainst making it more difficult for the blade 46 to make a clean pass through the cutting area 44 without undesirably slowing or stalling. Accordingly, the recess area 152 is provided to allow the cut end of the log 24 to expand slightly, thus slightly relieving and decreasing the downward force applied by the logs 24 against the blade face 46*a* and more readily allowing for a clean cut of all four of the logs 24 with the rotary blade 46 herein.

As best seen in FIGS. 1–3, the support and guide members 132, 134 and 140 and the blade 46 are supported downstream of the indexing feed mechanism 98 via frame members generally designated with reference numeral 154. In particular, there is a transverse frame member 156 which extends across and upwardly from the outlet end 102 of the feed mechanism 98 at an incline so that it is substantially normal to the log axis 24*a*. The member 156 defines the cutting area 44 in which the rotary blade 46 operates. A housing 158 for the blade drive is attached to the downstream side of the member 156 and includes a door 160 to provide access thereto for maintenance and the like.

Upon slicing of the chubs 26 via slicing operations at the slicing station 18, the chubs 26 fall onto a conveyor 162, as can be seen in FIG. 1. The conveyor 162 extends between the slicing station 18 and the harping station 20 so that sliced chubs 26 are transported thereby for the subsequent slicing operation on individual ones of the chubs 26 at the harping station 20, as previously described.

In the preferred and illustrated form, the above-described conveyor is in the form of vibratory table 162 which has its upstream end 164 generally oriented below the cutting area 44 so that sliced chubs 26 will fall generally downwardly onto the vibrating table surface 166. The table surface 166 can be oriented at a pitch or incline in the downstream direction so as to provide the chubs 26 with a gravity assist as they travel from the upstream end 164 toward the downstream end 168 thereof.

The vibratory conveyor table 162 generally causes any chubs 26 that land on their cylindrical outer surface 38 to reorient themselves from their less than stable orientation on the curved surface 38 to their more stable orientation that is an upright vertical orientation with one of the flat end-faces 34 or 36 engaged on the table surface 166. In addition to the curvature of surface 38 and the flatness of surfaces 34 and 36, the shorter axial length of the surface 38 relative to the diameter across the surfaces 34 and 36 renders the vertical orientation of the chubs 26 more stable than when they are laying on their sides 38. The planar, parallel cut end-faces 34 and 36 also can contribute to the ability of the chubs 26 to maintain a vertical orientation on the table surface 166 as they travel downstream thereon. To ensure that the cubs 26 stay on the table surface 166, a pair of raised guide rails 170 and 172 can be provided on either side of the table surface 166 extending between the upstream and downstream ends 164 and 168 thereof.

As previously has been discussed, the harping and insertion stations 20 and 22 are closely adjacent to each other. This provides for space conservation, and allows the chub advancing mechanism 56 of the harping station 20 to be used to shift the stacks 12 to the insertion station 22, as has been described. To provide efficiencies in production, the illustrated and preferred form of the automated system 16 herein provides for four operating units 174 each including a set of adjacent harping and insertion stations 20 and 22, as best can be seen in FIG. 12.

Chubs 26 from the vibratory conveyor table 162 are directed to each of the operating units 174. For this purpose, a diverter in the form of a wedge guide 176 is provided on the conveyor surface 166 intermediate the ends 164 and 168 thereof. The wedge guide 176 is operable to divert chubs 26 as they travel downstream on the table 162 to feed channels 178 on either side of the table surface 166 toward the downstream end 168 thereof. The wedge guide 176 includes a pair of guide members 180 and 182 that meet at an upstream point and are mounted on the table surface 166 so that they diverge from each other as they extend downstream toward the feed channels 178. The downstream ends of the members 180 and 182 are closely adjacent inlets 184 of the innermost pair of channels 178 so that chubs 26 either enter the innermost pair of channels 178*a* or the outermost pair of channels 178*b*. As shown in FIG. 1, a plurality of free wheeling rollers 186 are rotatably mounted to the table surface via generally vertically extending bearing shafts 188 that allow the rollers 186 to freely rotate thereabout. The rollers 186 are effective to keep the chubs 26 on the table surface 166 progressing in a downstream path thereon, and can be located adjacent the inlets 184 so as to direct the chubs 26 therein and to keep chubs 26 from entering the area on the table surface 166 downstream of the wedge guide 176 between the channels 178*a*.

As previously mentioned, there are four operating units 174 and each of the units 174 is associated with one of the feed channels 178 for receiving chubs 26 therefrom. In this regard, the operating units 174 are mounted on a table member 190 that is generally at a lower elevation than that of the downstream end 168 of the vibratory conveyor table 162, as best seen in FIGS. 11 and 12. As each of the operating units 174 is on the table member 190 spaced form the conveyor downstream end 168, the feed channels 178 each include chute portions 192 that lead the chubs 26 from the end 168 of the conveyor table 162 to the respective operating units 174.

As shown in FIG. 12, inner feed portions 192*a* are associated with inner feed channels 178*a* and outer chute portions 192*b* are associated with outer feed channels 178*b*. The chute portions 192 each include a generally horizontal run 194 and a generally downwardly inclined run 196. In this manner, chubs in the feed channels 178 come off of the vibratory conveyor table 162 into the chute portions 192 and traverse the horizontal run 194 thereof and build up therein until run 194 is substantially full, whereupon they enter the downward inclined run 196 which allows them to be readily directed toward their respective operating unit 174 in the longitudinal direction of travel denoted by arrow 197 in FIG. 13.

Each of the operating units 174, and specifically the harping station 20 thereof is provided with a staging area, as has been generally designated with reference numeral 54. The staging area 54 is adjacent the chub advancing mechanism 56. The staging area 54 receives a chub 26 therein which is then indexed into proper position relative to the advancing mechanism 56 for being shifted thereby via timed operation of power actuators 200 and 202, as will be described more fully hereinafter. The operating units 174 each include a horizontal support member 204 secured to the table 190 about which the chubs 26 are indexed so that they are raised above the surface 190*a* of the table 190.

More specifically, the power actuators 200 and 202 can be power cylinders 206 and 208, respectively, similar to power cylinder 66. The power cylinders 66, 206 and 208, all are preferably pneumatic cylinders each including a driven cylinder plunger 209 that shifts between extended and retracted positions relative to its cylinder.

The horizontal support member 204 fixedly mounts three generally parallel elongate slide bearing members 210, 212 and 214 extending transverse and as shown, preferably perpendicular to the longitudinal travel direction 197 as denoted by arrow 215 in FIG. 13. The slide bearing member 210 includes a guide portion 216 thereof adjacent outlet end 218 of the chute 192. Between the bearing members 210 and 212 is a slide member 220 that is shifted upon actuation of the power cylinder 206.

To form the staging area 54, the slide member 220 has an open-ended chub carrying compartment 222 at its distal end aligned with the guide portion 216 of bearing member 210 and the outlet 218 of the chute portion 192. The compartment 222 is formed by parallel vertical side surfaces 224 and 226 generally aligned with sidewalls 228 and 230 of the chute portion 192 that are spaced slightly further than the diameter across the faces 34 and 36 of the chubs 26. In addition, the width of the slide member 220 in the direction 197 transverse to its direction of movement upon actuation of power cylinder 206, and thus the size of the surfaces 224 and 226 in this direction is approximately the same or slightly larger than the diameter across the chub faces 34 and 36. In this manner, the carrying compartment 222 is sized to receive a single one of the chubs 26 upon its exit from the chute portion 192.

Figure 14:
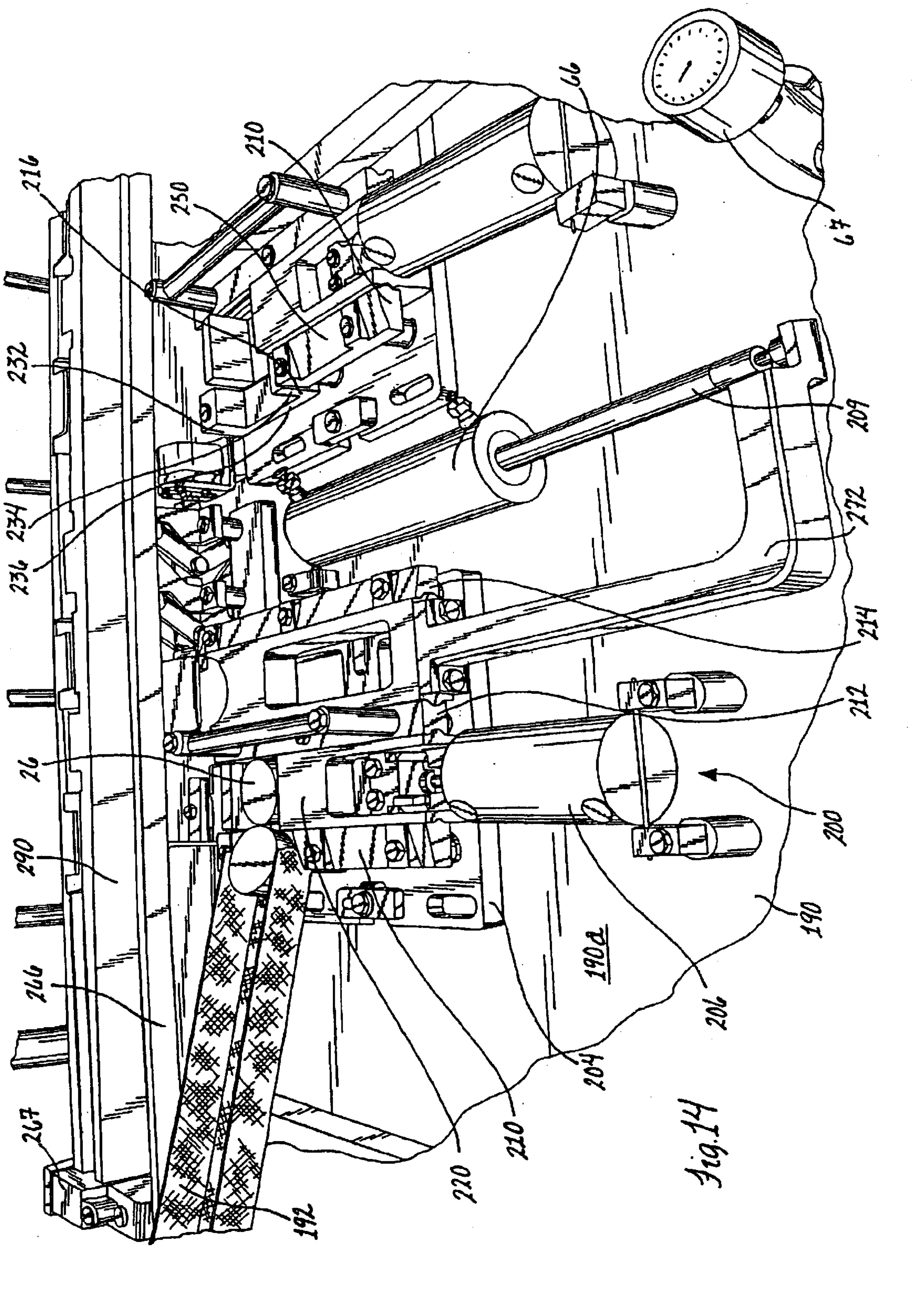
FIG. 14 is a color photographic view of the operating unit showing chubs entering the staging area from a chute extension portion of a channel on the chub conveyor.

For directing the chubs 26 into the compartment 222, the guide portion 216 of the slide bearing member 210 has upstanding wall portions 232 and 234 interconnected by bottom wall portion 236, as best seen in FIG. 14. The wall portions 232 and 234 are spaced at a slightly greater distance from each other than the corresponding sidewalls 228 and 230 of the feed channel chute portion 192 so that at the outlet end 218 thereof, the sidewalls 228 and 230 can fit and extend between the wall portions 232 and 234 for feeding chubs 26 to the staging area compartment 222. As previously mentioned, the compartment 222 is open-ended in the direction 197 of movement of the chubs 26 down the chute 192. For receiving chubs 26 in the compartment 222, the slide bearing member 212 closes off the open end of the compartment distal from the outlet 218 of the chute 192 so that pressure from the pushing action generated by chubs built up in the chute 192 on the chub 26 in the compartment 222 can cause the chub 26 in the compartment 222 to bear against the slide member 212, as seen in FIG. 15.

The chub 26 in the compartment 222 can be indexed to the chub advancing mechanism 56 for slicing based upon timed intervals of operation for each of the power cylinders 66, 206 and 208 such as under control of a PLC. In this regard, when the cylinder 206 is actuated to shift its plunger rod 209 to the extended position, the cylinder 208 has already been actuated so that its plunger rod 209 is in its retracted position. Preferably, upon actuation of the cylinder 206, the power cylinder 66 will also have been actuated so that its plunger rod 209 is in its extended position, as shown in FIG. 14 and for reasons described hereinafter.

When the power cylinder 206 is actuated to shift its plunger rod 209 to its extended position, the slide member 220 will linearly slide in the transverse direction 215 between the slide bearing members 210 and 212 carrying the chub 26 in the compartment 222 therewith. As best seen in FIG. 15, the slide bearing members 210, 212 and 214 can be of a low friction plastic material with the intermediate guide member 212 provided with opposing guide ways 238 and 240 formed on either side thereof. An elongate projection 242 extends from side 244 of the slide member 220 for a tight sliding fit in the guide way 238. The slide member 220 can also be of a low friction plastic material similar to the slide bearing members. A v-groove 246 is formed in opposite side 248 of the slide member 220, and a corresponding shaped projection 249 extends from raised portion 250 of the slide bearing member 210 for a sliding fit in the groove 246. The remaining components of the system 16 herein are preferably of a food grade stainless steel material such as the table 190, chute portions 192, support member 204, cylinders 66, 206, 208, and the cylinder rods 209 therefor.

To rigidly connect the cylinder rod 209 of the power cylinder 206 to the slide member 220, an attachment head 252 is provided at the distal end of the rod 210. The slide member 220 includes a stepped well 254 formed adjacent its proximate end, including a slot opening 256 thereto through which the cylinder rod 209 extends, as shown best in FIG. 17. An integral recessed block portion 258 is formed in the well 254, and the attachment head 252 can have an L-shaped configuration for seating tightly thereagainst and being fastened thereto as by bolting or the like.

Figure 16:
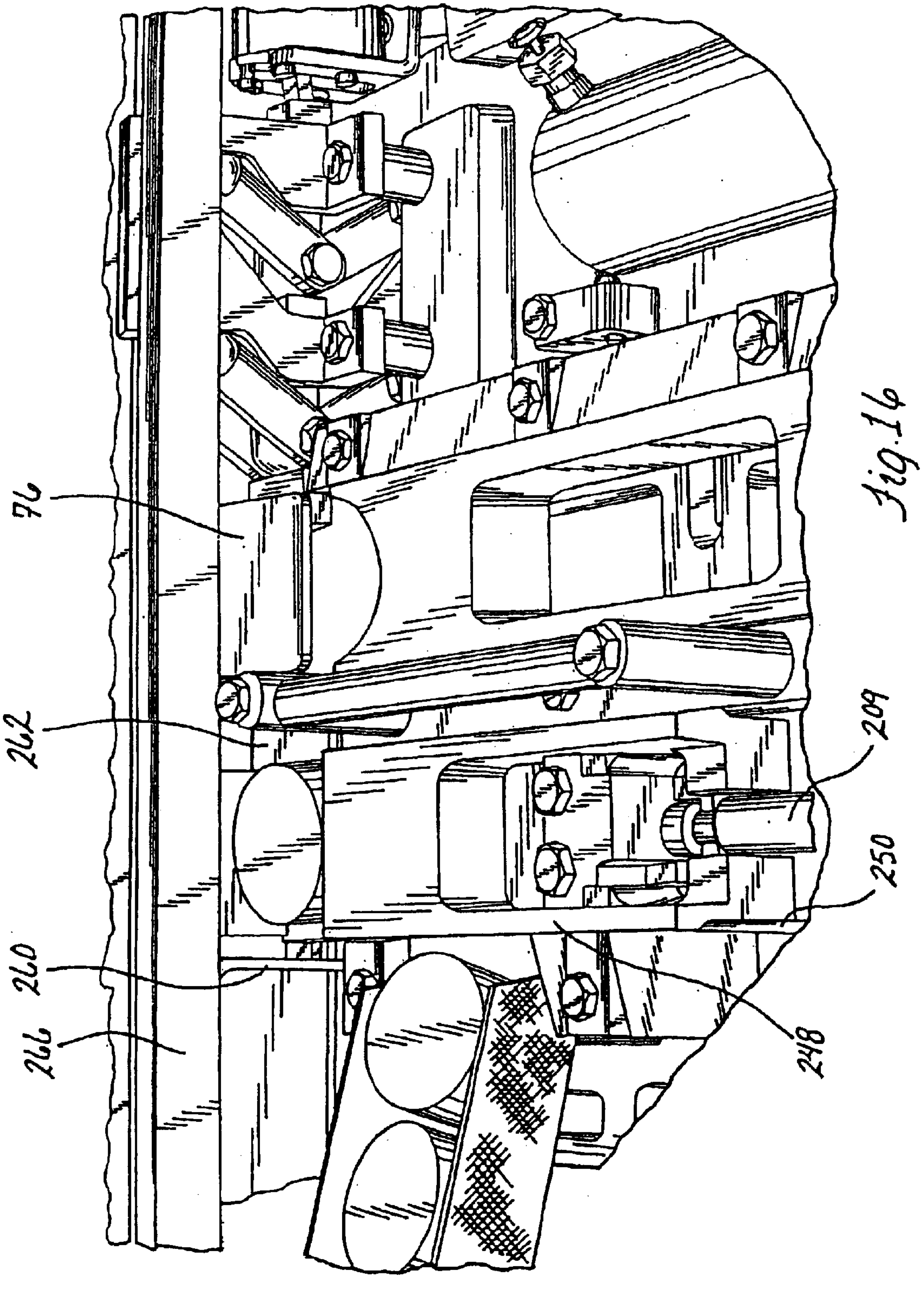

When the power cylinder 206 is actuated to cause the rod 209 to shift to its extended position, the slide member 220 will shift therewith transverse to the travel direction 197 of the chubs 26 into the staging area carrying compartment 222, as shown in FIG. 16. In this position, the chub 26 in the compartment 222 is ready for being indexed into position for being engaged by the chub advancing mechanism 56. As can be seen, the side 248 of the advanced slide member 220 spans the distance between upstanding wall portions 232 and 234 of the slide bearing member guide portion 216, so that chubs 26 can continue to build up in the chute portion 192 without advancing out from the outlet end 218 thereof. In this regard, photo sensors or the like can be provided to monitor the build up of chubs 26 on the vibratory table 162 as well as in the feed channels 198 to effect an automatic shutdown of the feed mechanism 98 at the slicing station 18 until the backup of chubs has been obviated by continued production of sliced stacks 12.

As generally can be seen in FIG. 12, the four operating units 174 are split into two pairs that are generally oriented on either side of the table 190. Accordingly, the transverse sliding of the slide members 220 pushes the chubs 26 on opposite sides of the table member 190 centrally toward each other and in alignment with chubs 26 being processed by the operating unit 174 on the same side of the table member 190.

Figure 17:
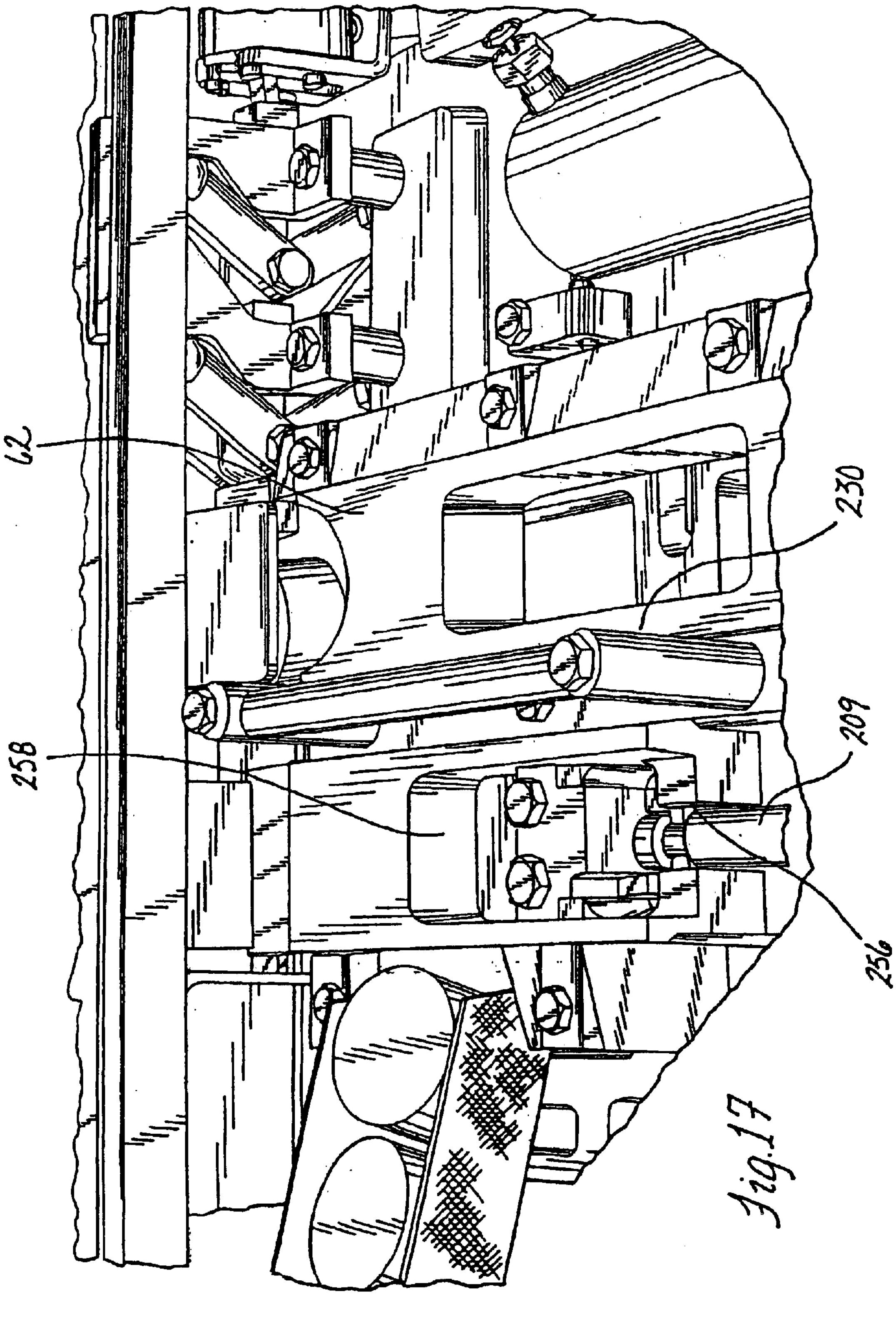

With the chubs 26 in the compartments 222 as shifted by the slide member 220 in its extended position via piston rod 209, they will be in position for being indexed into alignment with the chub advancing mechanism 56, and specifically the arcuate engagement end 62 thereof. In this regard, it is noted that the chubs 26 are to be shifted in a direction parallel to their original travel direction 197 in the chutes 192 at a more central region on the table 190. For this purpose, paddle push members 260 are employed to engage the chub 26 through the opening formed between the slide member surfaces 224 and 226 and, with the opposite opening now clear of the slide bearing member 212, through the compartment 222 so that the chub 26 is deposited in the area aligned with the chub advancing mechanism 56, and specifically on the lower member 78 of the chub centering mechanism 74, as seen in FIG. 17. To this end, the lower member 78 can include a lead-in surface portion 262 on which the chub slides once out of the compartment 222 until it is aligned between the chub centering mechanism upper and lower members 76 and 78.

Referring again to FIGS. 11, 12 and 16, it can be seen that the paddle members 260 are formed integrally on a pair of longitudinally extending bars 264 and 266 interconnected by a shorter joining transverse bar 268 at the end of the bars 264 and 266 adjacent the downstream end of the vibratory conveyor table 162. The distal end of the plunger rod 209 of power cylinder 208 is rigidly connected to the transverse bar 268 at approximately the midpoint thereon, so that actuation of the cylinder 208 causes the longitudinal bars 264 and 266 to shift equally in the longitudinal direction 197. Slotted transverse supports 267 and 269 are mounted to the table 190 adjacent ends of the bars 264 and 266 to support the bars 264 and 266 in outer end slots thereof (see opposite end slots 269*a* and 269*b* in FIG. 25) for their sliding movements upon operation of the cylinder 208. With the plunger rod 209 in its retracted position, the paddle members 260 will be in the position shown in FIG. 16 generally aligned with the outlet end 218 of each of the feed channel chute portions 192 associated with respective ones of the operating units 174 to provide clearance for the slide member 220 to index a chub 26 carried thereby as has been described.

With single ones of the chubs 26 in respective carrying compartments 222 of the slide members 220 indexed in direction 215 via operation of the power cylinder 206 to its extended state, the power cylinder 208 then fires to shift its plunger 209 to its extended position causing the paddle members 260 to shift longitudinally through the carrying compartments 222 with each of the four chubs 26 riding on lead-in surfaces 262 of the lower members 78 of each of the operating units centering mechanisms 74. In this manner, power cylinder 208 acts as a common cylinder for driving each of the paddle members 260 associated with each one of the operating units 174.

As can be seen in FIG. 17, with the cylinder 208 actuated so that the plunger 209 is in its extended position, the stroke of the cylinder 208 is such that the paddle member 260 well have shifted the chubs 26 off of the lead-in surfaces 262 to be in substantial alignment between the centering mechanism upper and lower members 76 and 78 in each of the operating units 174. In this position, the chubs are substantially aligned with the engagement ends 62 of the chub advancement mechanisms 56 in each of the operating units 174.

More specifically, the advancement mechanism 56 includes a pusher member 270 such as of stainless steel material and having the engagement end 62 formed thereon. At the end opposite to the arcuate engagement end 62, the pusher member 270 includes an L-shaped member rigidly connected thereto with the opposite end of the member 272 connected to distal end of the plunger rod 210 of the power cylinder 66. Accordingly, operation of the power cylinder 66 to shift the plunger rod between retracted and extended positions thereof causes the pusher member 270 to move in the transverse direction 215 via the rigid connection provided by the L-shaped member 272 therebetween. As is apparent, each of the operating units 174 includes both a power cylinder 66 for its chub advancement mechanism 56 and a power cylinder 206 for the slide member 220.

As best seen in FIG. 14, the power cylinders 206 and 66 generally face oppositely to each other in terms of the cylinder end from which the plunger rod 209 extends. In this regard, the L-member 272 allows the power cylinder 66 to be adjacent the chub pusher member 270 that it drives for conserving space on the table 190 in the transverse direction 215. Accordingly, while actuation of the cylinder 206 so that the plunger rod 209 thereof is in its extended position causes the slide member 220 to advance, similar operation of the power cylinder 66 with its plunger rod 209 in its extended position causes the pusher member 270 to retract. Likewise, operation of the cylinder 206 so that its plunger 209 is retracted causes the slide member 220 to similarly retract. Operation of the cylinder 66 so that its plunger 209 is retracted causes the pusher member 270 to advance thus bringing the arcuate end 62 thereof into engagement with the chub 26 in alignment therewith for slicing via the harping blades 58, as described more fully hereinafter.

Figure 18:
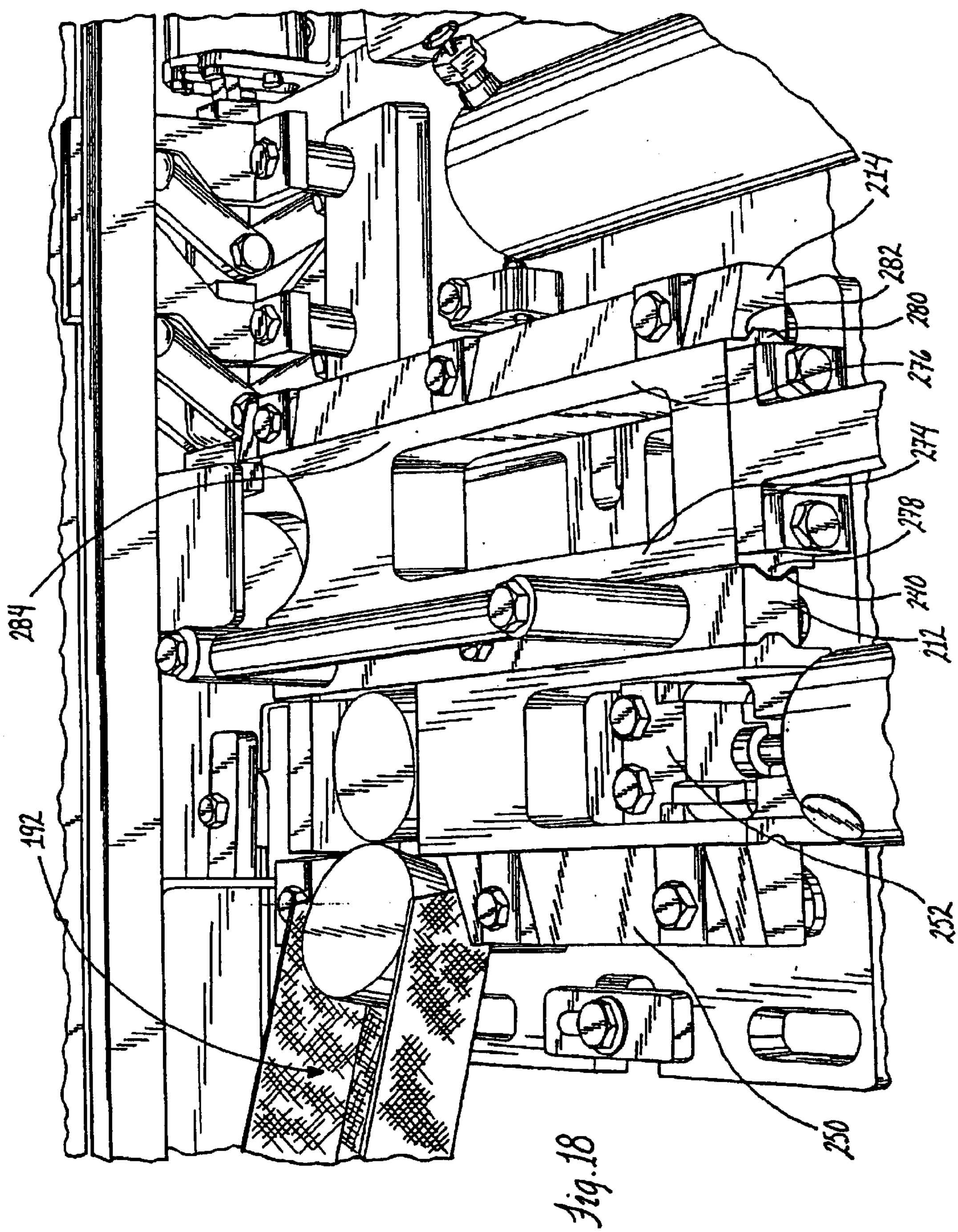
Figure 19:
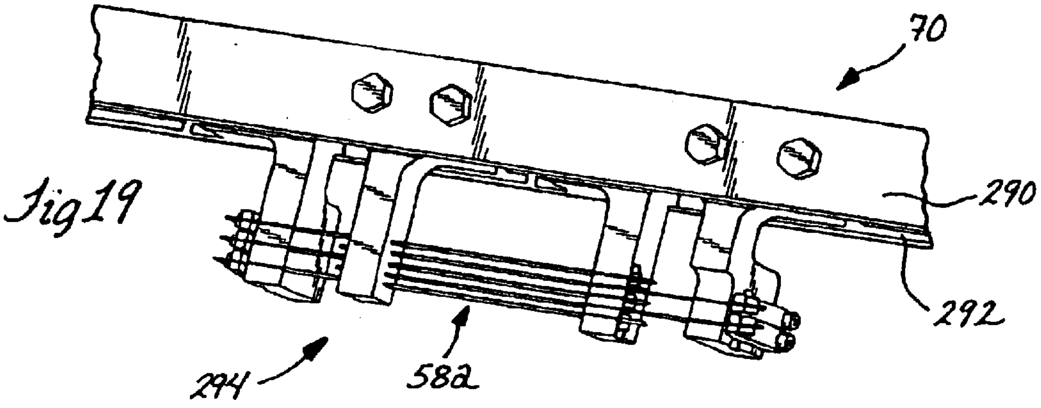
FIGS. 19 and 20 are color schematic perspective views of reciprocating harping blades in a blade set showing blade mount bars and mounting arms attached thereto.

Referring now to FIGS. 17 and 18, before the cylinder 66 is operated to retract its plunger 209 for advancing the pusher member 270, the cylinders 206 and 208 are timed so that after cylinder 208 is fired to its extended position for shifting the chubs 26 as shown in FIG. 17, the cylinder 206 will be fired to its retracted position to retract the slide member 220 for bringing the compartment 222 back into alignment with the chute portion 192 for receiving the leading chub 26 in the associated chute portion 192 therein, as seen in FIG. 18. Either before or after the cylinder 206 is operated to shift to its retracted position, the cylinder 208 can be operated to shift back to its retracted position, as also seen in FIG. 18. Preferably, the cylinder 208 is operated for retraction after the cylinder 206 has retracted the slide member 220 so that the paddle members 260 shift to their retracted position in clearance from the distal end of slide member 220. Alternatively, the cylinder 208 can retract the paddle members 260 prior to operation of cylinder 206 for retracting the slide member 220 with the members 260 traveling through now empty slide member compartment 222.

As can be seen best in FIG. 18, the pusher member 270 has opposite sides 274 and 276 adjacent the slide bearing members 212 and 214, respectively. Along the length of the pusher member sides 274 and 276 are longitudinally extending projections 278 and 280, respectively, that are formed approximately mid-way along the height of the sides 274 and 276. The projection 278 is sized to mate in the elongate guide way 240 of the bearing member 212 for a tight sliding fit therein. Similarly, bearing 214 includes an elongate guide way 282 such that projection 280 has a tight sliding fit therein. In this manner, the pusher member 270 is guided via the slide bearing members 212 and 214 for back and forth sliding in the transverse direction 215.

Figure 30:
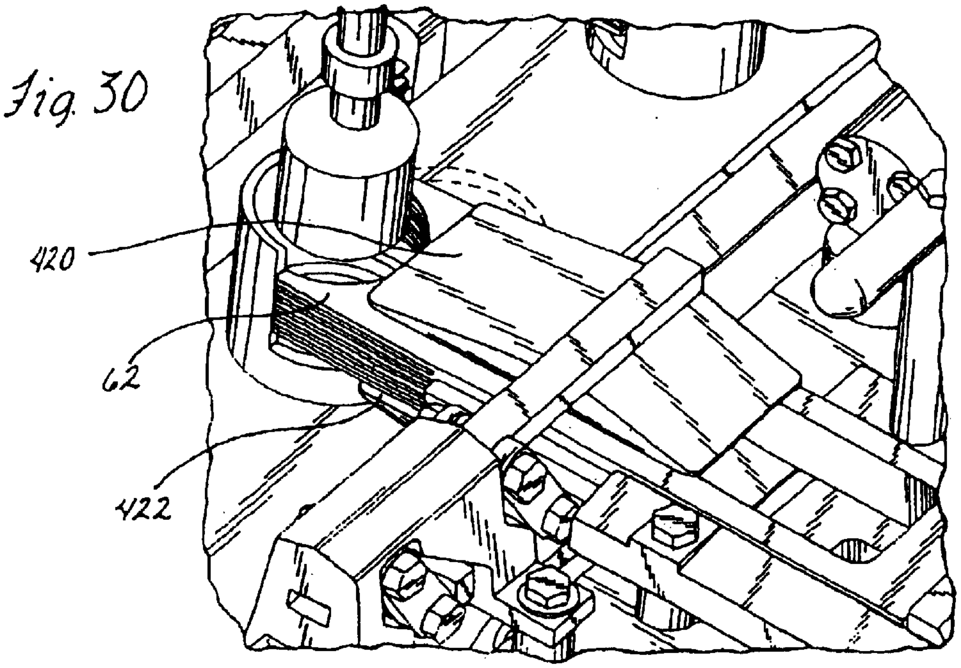
Figure 31:
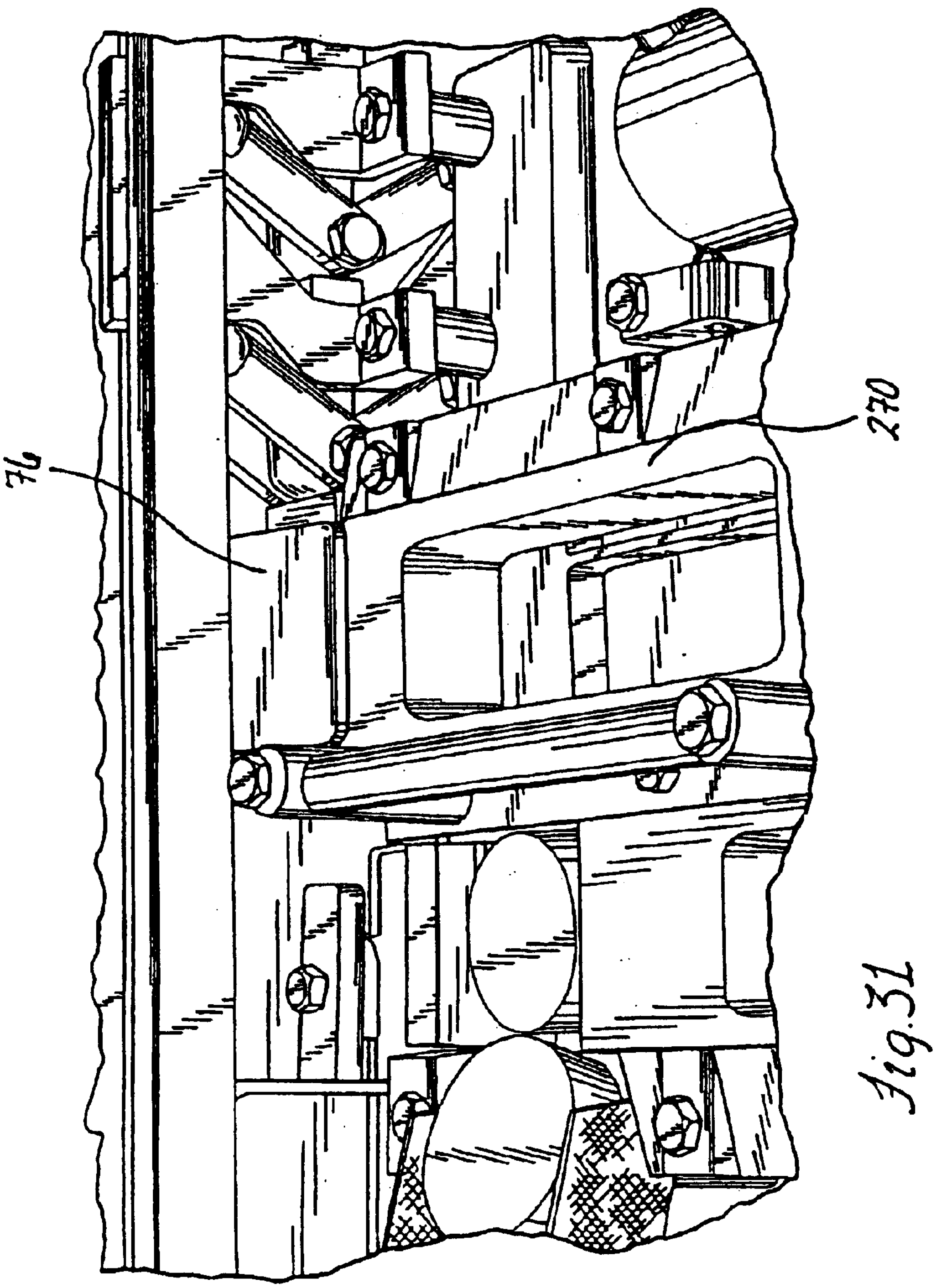
FIGS. 31 and 32 are color photographic views showing the chub pusher member extended to push the chub through harping blades and the stack to a receptacle at the insertion station.

As previously mentioned, the arcuate engagement end 62 of the pusher member 270 has a slotted construction, as can be seen in FIGS. 13 and 30. More specifically, the pusher member 270 has a body 284 having an elongate window opening 286 formed therein between the sidewalls 274 and 276 thereof. The opening 286 at its forward or distal end stops short of the arcuate engagement end 62 of the pusher member 270. A plurality of horizontal slots 288 are formed in the pusher member body 284 at the distal end 62. The slots 288 are equal in number to the number of harping blades 58 to allow the pusher member 270 to advance the chubs 26 through the blades 58 for creating the stacks 12. In the preferred and illustrated form, stacks 12 of six meat slices 30 are formed via five harping blades 58 such that there are likewise five horizontal slots 288 formed in the pusher member arcuate end 62. From top to bottom, the pusher member 270 is sized to generally correspond to the height of the chub cylindrical surface 38 so that the engagement end 62 bears on the surface 38 for substantially the full height thereof, less the areas corresponding to the thin or narrow slot spacings 288 formed in the end 62. For secure engagement with the chub 26, the curvature of the end 62 extends dose to 180° about the chub surface 38. The horizontal slots 288 extend rearwardly toward the pusher member opening 286 a sufficient distance in the direction 215 to allow the entire pusher member arcuate end face 62 to be advanced past the harping blades 58 at which point the meat slices 30 have been formed and to continue to push the stack 12 to the insertion station 22. To this end, the slots 288 extend rearwardly in the pusher member body 284 and stop adjacent the forward end of the opening 286.

Referring next to FIGS. 19–23, the harping blades 58 and the blade mount assembly 70 therefor will be more particularly described. The blade mount assembly 70 carries the blades 58 for reciprocation in the longitudinal direction 197 as the pusher member 270 advances the chubs 26 therethrough in the transverse direction 215 via actuation of the power cylinder 66 to its retracted state. For this purpose, the blade mount assembly 70 includes two pairs of longitudinal bar members 290 and 292 each of which carries a predetermined number of blades 58 less than the total number of blades 58 in a blade set 294 needed to cut the chubs 26 into the stacks 12 at each of the operating units 174, and specifically at the harping stations 20 thereof. As shown, the blade mount bar 290 carries two blades 58 and the blade mount bar 292 carries the remaining three blades 58 in a set 294 such that opposite movements of the bars 290 and 292 in the longitudinal direction 197 via the blade drive 66 will generate the desired reciprocating movement of the harping blades 58 relative to each other.

Each one of the pairs of bar members 290 and 292 is disposed inward relative to the center of the table 190 of an adjacent one of the longitudinal bars 264 and 266 so that each pair of bar members 290 and 292 carries blade sets 294 for two adjacent harping stations 20 on the same side of the table 190, as best seen in FIG. 12. More specifically, the bar member 290 is disposed between the adjacent one of the bar members 264 or 266 and the bar member 292, which is located closest to the center of the table 190. Each of the bars 290 and 292 includes pairs of depending arms 296 and 298, there being two such pairs of arms 296 and 298 with each bar 290, 292, in the illustrated form. The arms 296 and 298 include respective plate mounts 300 and 302 integral therewith for securing the arms 296 and 298 to the bars 290 and 292. In this regard, the plate mounts 300 and 302 are attached to inner surfaces 290*a* and 292*a* of the respective bars 290 and 292 that are in facing relation to each other. This allows the blades 58 carried by the two pairs of arms 296 and 298 to be aligned with each together for longitudinal shifting in the space between two adjacent blades or over or under a blade carried by the opposite bar 290 or 292 when undergoing reciprocating action, as shown and described hereinbelow. In this manner, the blade sets 294 are disposed in the area aligned below the space between adjacent bar members 290 and 292.

For attaching the plate mounts 300 and 302 to the bars 290 and 292, their surfaces 290*a* and 292*a* each include cross-recesses 304 into which corresponding raised cross-portions 306 of the plate mounts 300 and 302 fit. The plate mounts 300 and 302 are also fastened to the bar members 290 and 292 via bolting or the like.

Figure 21:
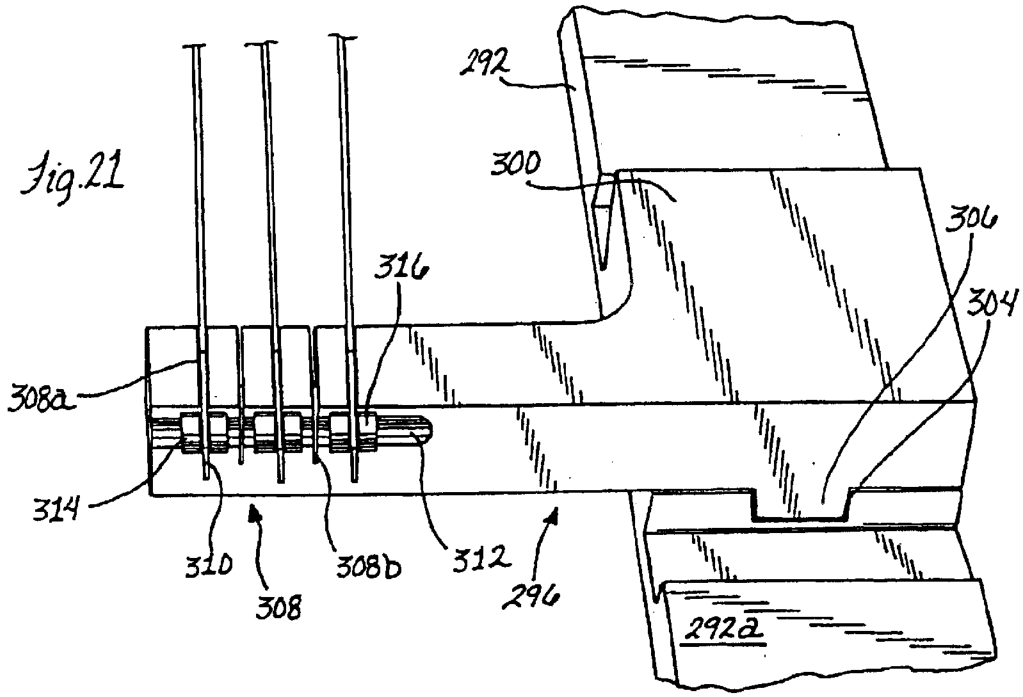
Figure 22:
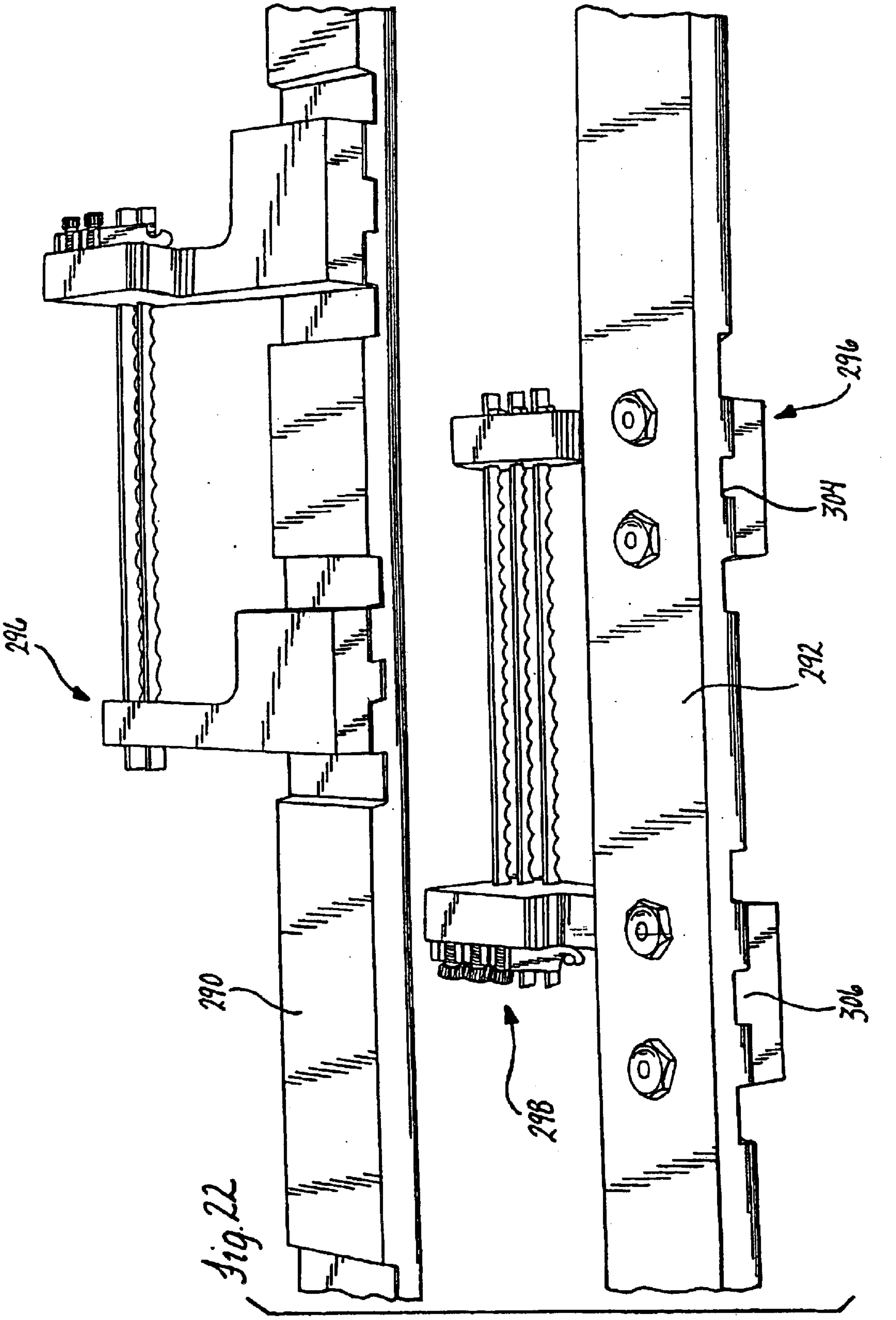

Referring more specifically to FIG. 21, the arms 296 secured to bar 292 will next be described. As shown, the arm 296 projects down from one side of the plate mount 300 thereof. Toward the lower end of the arm 296, there are five narrow slots or slits 308 extending transverse through the arm 296 and opening inwardly in a direction away from bar surface 292*a* and thus toward the chub pusher member 270. Three harping blades 58 are secured in three of the slits 308*a* spaced from each other by open slits 308*b* with the blades 58 having their serrated edge 60 facing the pusher member 270. For this purpose, ends 310 of the blades 58 extend out from the slits 308*a* into an arcuate recess area 312 formed on the outer side of the leg 296. Double-headed rivets 314 extend through the blade ends 310 with the rivet heads 316 residing in the recess 312 so as to limit sliding of the blades 58 along their length. Arms 296 substantially identical to that carried by bar 292 as described above are carried by bar 290, however with the slits 308 formed so that they open in a direction toward the bar surface 290*a* and thus toward the pusher member 270. In addition, the arm 296 of bar 290 carries only two blades 58 which are mounted in slits 308*b* thereof leaving slits 308*a* open with the edge 60 of the blades 58 facing the pusher member 270.

The slits 308*a* of the arm 296 carried by the bar 290 are vertically aligned with the slits 308*a* of the arm 296 carried by the bar 292. The slits 308*b* on the arms 296 of each bar 290 and 292 are likewise vertically aligned. In this manner, when the blades 58 are reciprocating, the two blades carried by the arm 296 of bar 290 will pass through the two open slits 308*b* of arm 296 on bar 292; and, in a similar manner, the three blades 58 carried by the arm 296 on bar 292 will pass through the three open slits 308*a* on arm 296 carried by bar 290.

Figure 23:
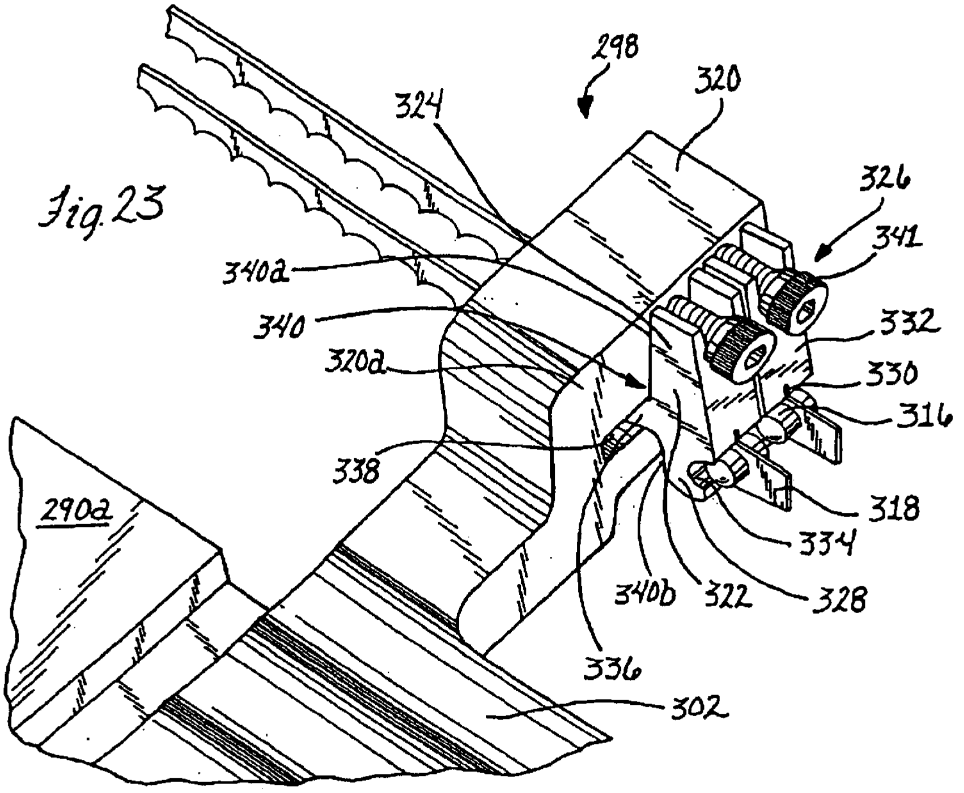
FIGS. 21–23 are color photographic views showing details of the blade mount bars and their arms securing the blades thereto.
Figure 24:
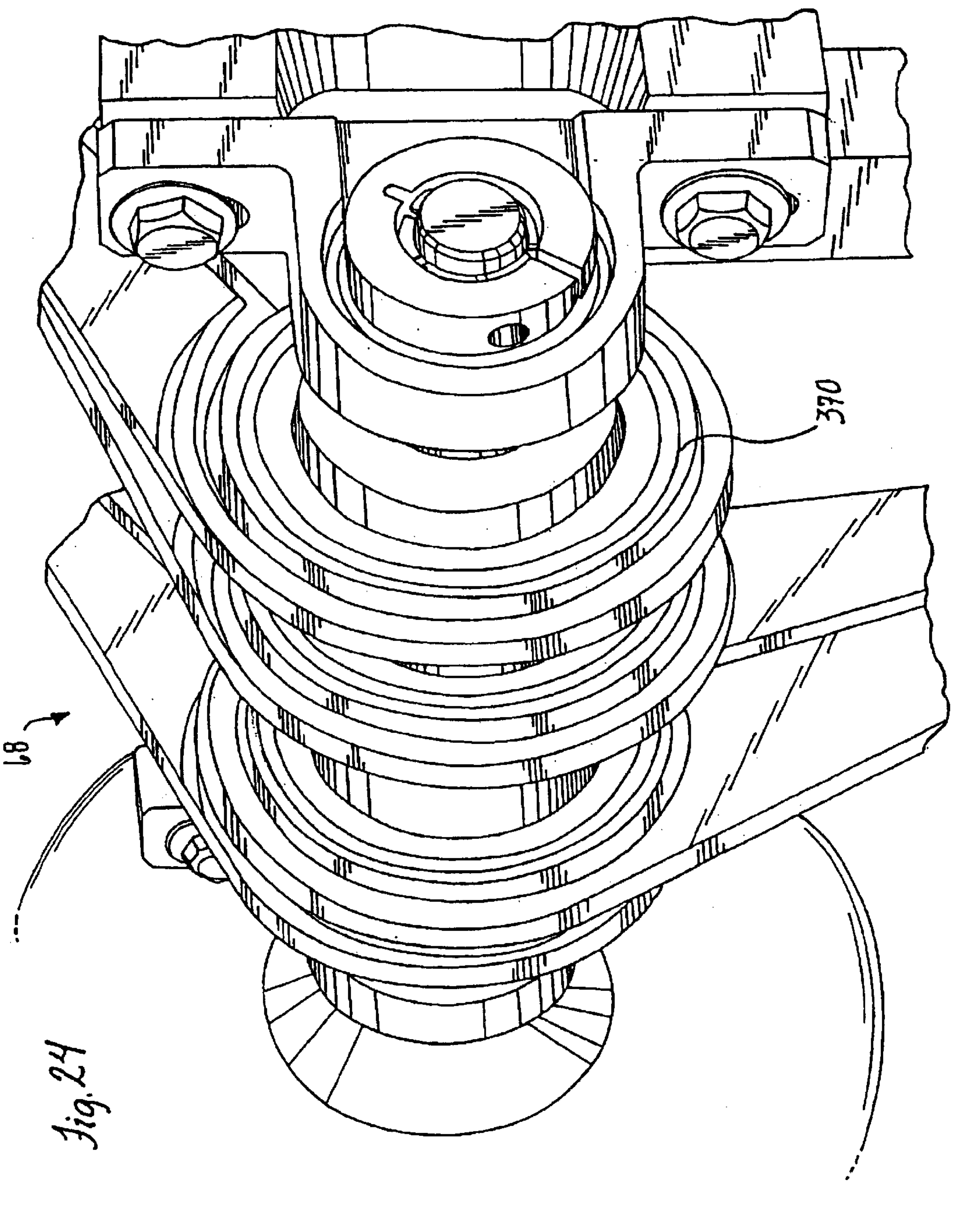
FIG. 24 is a color photographic view of an eccentric blade drive for reciprocating the harping blades.

At their outermost ends 318 relative to the chubs 26 as will be described hereafter, the blades 58 are mounted to mounting arms 298, such as shown in FIG. 23 with respect to bar 290. The arms 298 only include the number of blade slits 308 corresponding to the number of blade ends 318 attached thereto as blades 58 mounted to a corresponding pair of arms 296 and 298 on the other one of the bars 290 or 292 in a blade set 294 do not need to pass therethrough during the reciprocating action of the harping blades 58. Thus, the arms 298 will have either two slits if mounted to bar 290 or three slits if mounted to bar 292. Accordingly, for a blade set 294, there is one pair of arms 296 and 298 on bar 290 that carry two of the blades 58 and another corresponding pair of arms 296 and 298 on bar 292 that carry the other three blades 58 of the set 294. Also and has been mentioned, each pair of bars 290 and 292 has two blade sets 294 associated therewith so that each bar 290, 292 in a pair will have two mounting arms 296 and two mounting arms 298 that it carries.

The arms 298 include enlarged lower ends 320 in the direction transverse to the length of the blades 58 for the provision of tensioning members 322 on the outer side 320*a* of the leg ends 320, as best seen in FIG. 23. The tensioning members 322 include a forked end 324 through which a threaded adjustment member 326 passes and into a threaded recess in the enlarged end 320 of the arm 298 for securing the tensioning member 322 thereto. At its other end 328, the tensioning member 322 includes a slit 330 aligned with one of the slits in the arm enlarged end 320. The slits 330 extend through to the outer surface 332 of the tensioning member 322 and in which an arcuate recess 334 is formed. The blade ends 318 pass through these slits 330 and are secured at the tensioning members 322 as by the double-headed rivet 314 with the heads 316 residing in the recess 334.

The tensioning member 322 includes a projection 336 formed on inner surface 340 thereof facing the outer side 320*a* of the arm enlarged end 320. The projection 336 is seated in a groove 338 in the arm outer side 320*a* and is allowed to pivot slightly therein for tension adjustments of the blade 58 associated with the tensioning member 322. In this regard, the tensioning member 322 inner surface is 340 faceted so that on either side of the projection 336, there are surface portions 340*a* and 340*b* that taper from the projection 336 to either tensioning member end 324 and 328, respectively, and away from the outer side 320*a* of the arm 298.

Accordingly, turning head 340 of the adjustment member 326 in a tightening direction pivots the tensioning member 322 to bring the surface portion 340*a* closer to arm surface 320*a* with the surface 340*b* pivoting further from arm surface 320*a* with the projection 336 acting as a fulcrum. Because the blade ends 318 are secured in recess 334 located adjacent the tensioning member end 328, the tightening action of the adjustment member 326 causes a pulling force to be exerted on the blade 358 via the tensioning member 322 having its other end 310 secured to arm 296 so as to increase the tension thereon. To lessen the tension, the adjustment member 326 is turned in the loosening direction to allow the tensioning member 322 to pivot about projection 336 so that the tension in the blade 58 pulls the surface 340*b* closer to the arm surface 320*a* with the tensioning member 322 pivoting about the projection 336 so that surface 340*a* pivots away from the arm surface 320*a*. In this manner, the tensioning members 322 allow each blade 58 to have their tension levels individually controlled via the tensioning member 322 associated therewith. Precision control over the blade tension allows the optimum tension levels to be determined such as for different types of meats 10, temperatures thereof, and/or operating speeds of the various components of the automated system 16 herein, and specifically at the harping station 20 thereof, in terms of minimizing flexing and/or breakage of the blades 58.

Figure 25:
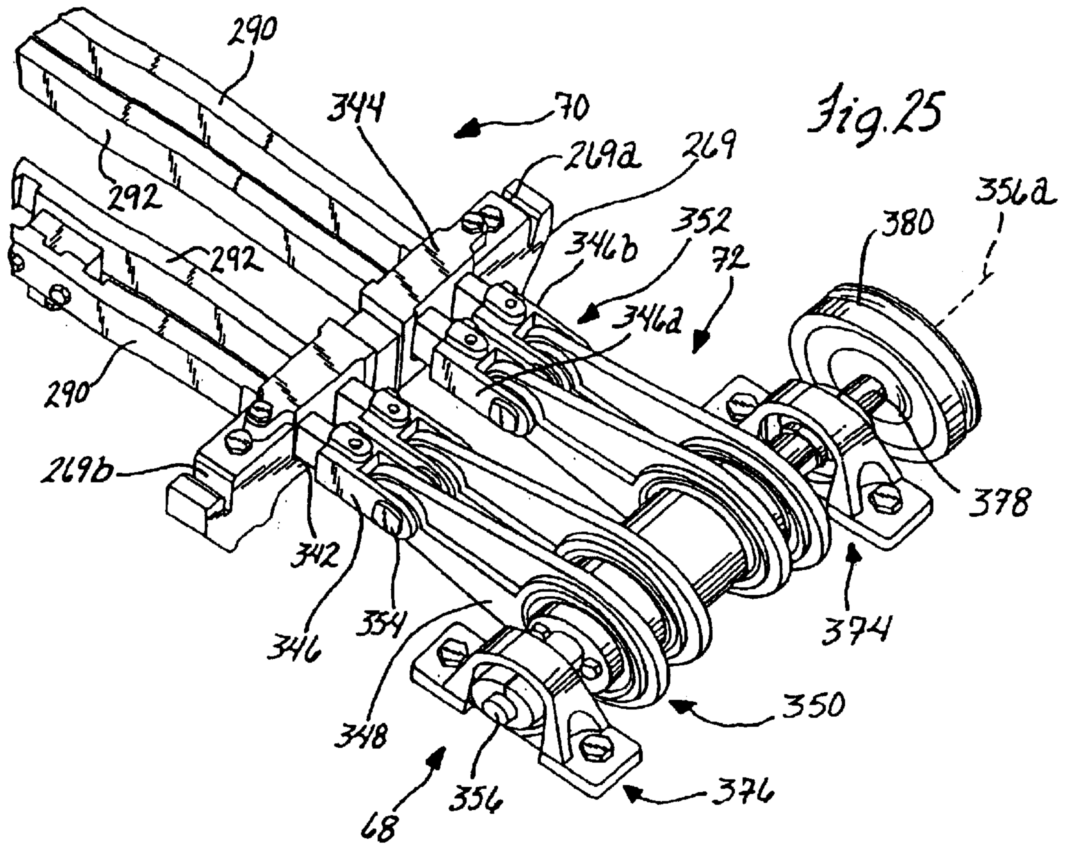
FIG. 25 is a color schematic perspective view of the eccentric blade drive showing pivotal plate actuators connected to the drive and to the blade mount bars.

Reciprocation of the harping blades 58 in a blade set 294 is caused by operation of the eccentric blade drive 68, as previously discussed. More particularly, the two pairs of blade mount bars 290, 292 extend in the longitudinal direction 197 and are supported for reciprocation along their length by the transverse slotted support bars 268 and 269 utilized for supporting the paddle member longitudinal bars 264 and 266 at either end of the table 190 via interior slots 342 formed in the support bars 268 and 269, as can be seen in FIG. 25 with reference to support bar 269. As shown, retainer members 344 can be fastened to the tops of the bars 268 and 269 with each retainer member 344 spanning across two adjacent support slots 342.

Each of the two pair of blade mount bars 290 and 292 are operatively connected to the eccentric blade drive 68. As best seen in FIG. 11, the blade drive 68 is disposed at the distal end of the table 190 from the downstream end 168 of the chub conveyor table 162. Ends of the bars 290 and 292 projecting through the slots supports 342 of the support bar 269 have devises 346 attached thereto, as shown in FIG. 25. The pivotal actuator 72 is in the form of a pivotal, oscillating plate member 348 which is connected at one end 350 to the eccentric drive 68 and at its other end 352 to the clevis 346. The plate 348 is pivotally attached between sides 346*a* and 346*b* of the clevis via a pivot pin 354 extending between the clevis sides 346*a* and 346*b*and through the plate end 352. The eccentric blade drive 68 is shown in FIGS. 24–27.

Figure 26:
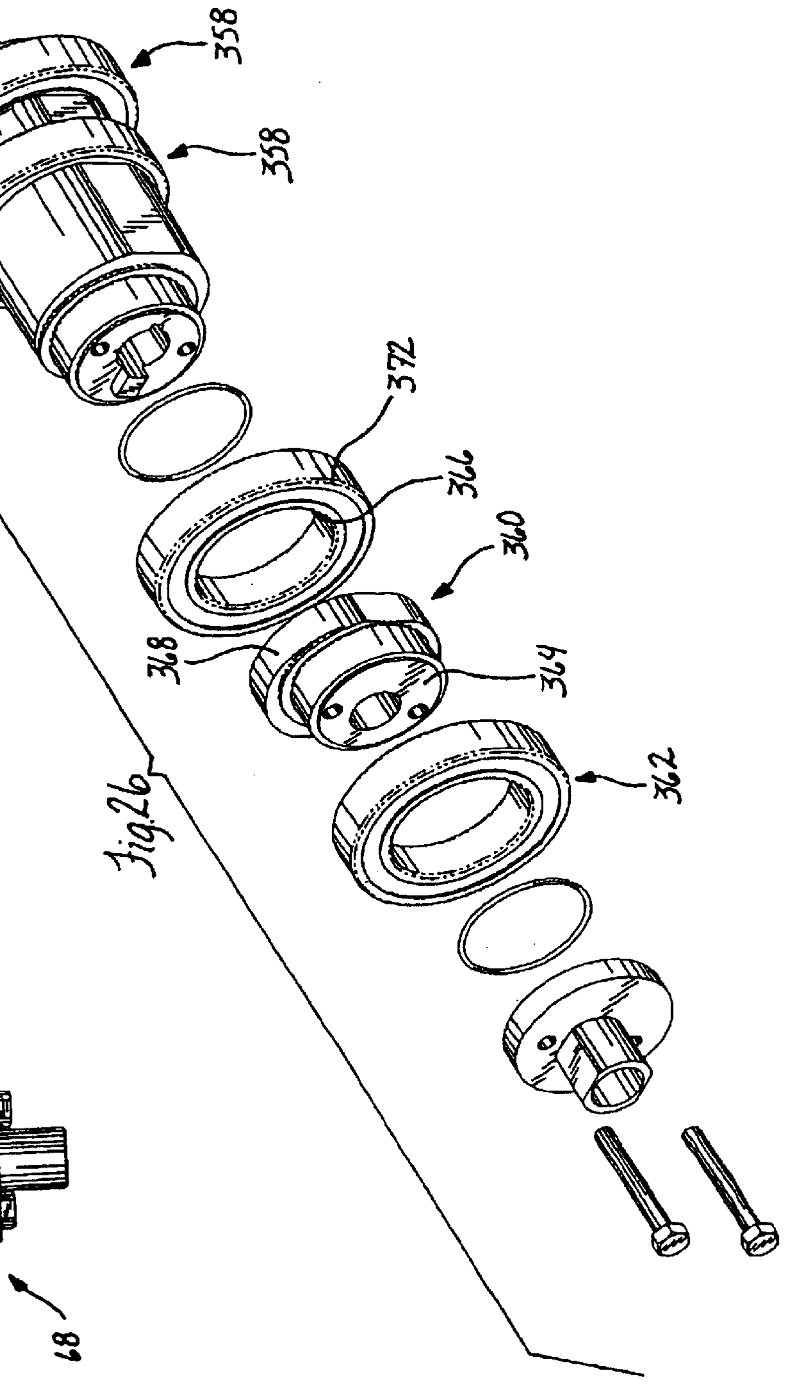
FIG. 26 is an exploded perspective view of the eccentric blade drive showing the construction of eccentric drive sections thereabout.
Figure 27:
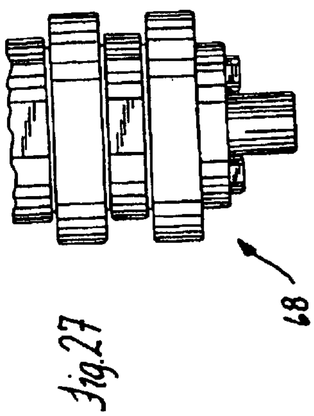
FIG. 27 is a plan view of the assembled eccentric blade drive sections of FIG. 26.

The eccentric drive 68 includes a drive shaft 356 extending along its axis 356*a* oriented in the transverse direction 215. Along the length of the drive shaft 356 are formed eccentric sections 358, each section 358 being associated with one of the blade mount bars 290 or 292. As best illustrated in FIG. 26, the eccentric sections 358 each include an eccentric drive portion 360 and a large annular ring bearing 362. The eccentric drive portion 360 is mounted to the drive shaft 356 for rotation therewith with the drive portion 360 including an offset lobe portion 364. The lobe portion 364 is formed such that when inner race 366 is pressed onto outer surface 368 of the drive portion 360, the central axis of the annular ring bearing 362 will be offset from the longitudinal axis 356*a* of the drive shaft 356. As shown, the lobe portion 364 will extend for a greater radial extent from the drive axis 356*a* to the outer surface 368 than the remainder of the drive portion 360.

The plate member 348 has its end 350 enlarged relative to its pivot end 352 so that the plate 348 has a generally triangular configuration. At the enlarged end 350 there is a large circular opening 370 for being mounted onto outer race 372 of the ring bearing 362. Accordingly, each plate member 348 is attached to one of the eccentric sections 358 of the drive shaft 356 via one of the ring bearings 362. As the drive shaft 356 rotates, the eccentric section 358 causes the attached plate member 348 to orbit about the shaft axis 356 thus alternately pulling on the connected blade mount bar 290, 292 as the shaft 356 rotates to shift the lobe portion 364 to the point furthest from the bar support 269 and pushing on the blade mount bar 290, 292 as the shaft 356 rotates to shift the lobe portion 364 to be at its closest point to the bar support 269.

The eccentric sections 358 are mounted to the drive shaft 356 such that offset lobe portions 364 in a pair of sections 358 associated with a pair of blade mount bars 290 and 292 have their respective offset lobe portions 364 spaced from each other by 180° about the drive shaft 356. In this manner, when one of the blade mount bars 290, 292 is undergoing a pulling action via its associated eccentric section 358, the other blade mount bar 290, 292 in the pair is undergoing an opposite pushing action via its associated eccentric section 358. Accordingly, the blades 58 carried by the mounting arms 296 and 298 on the respective blade mount bars 290 and 292 will alternate in their motion relative to each other so as to produce a slicing action on the chub 26 being pushed therethrough with the pusher member 270 of the chub advancing mechanism 56. In other words, opposite faces of a slice will be formed by blades 58 that are traveling in opposite directions to each other.

The offset lobe portion 364 is sized to provide the plate members 348 with a predetermined travel distance or stroke in the direction 197 such that a pair of associated adjacent blade mount bars 290 and 292 shift relative to one another whereby the outer arm 298 on one of the bars 290, 292 win not travel sufficiently to engage an adjacent inner arm 296 on the other of the bars 290, 292. In this regard, only central portions 58*a* of the blades 58 disposed between the arms 296 are exposed to the chub 26 pushed therethrough. It is at these portions 58*a* that the blades 58 secured to the arms 296 and 298 of one of the bars 290, 292 are mounted to overlap the blades 58 secured to the arms 296 and 298 of the other one of the bars 290, 292 for undertaking the scissor-like slicing action relative to each other as the blades 58 associated with one of the bars 290, 292 and the blades 58 associated with the other of the bars 290, 292 travel in opposite directions relative to each other, generally toward and away from each other in direction 197. The spacing of the arms 296 on respective bars 290 and 292 at its minimum will always be greater than the size of the pusher member 270 in the direction 197 so that its arcuate engagement end portion 62 can fit therebetween as it pushes the chubs 26 through the alternately, reciprocating blade portions 58*a*. In practice, the blades 58 undergo twelve inches of total reciprocating travel for a full slicing cycle of a chub 26, which takes on the order of 0.5 second to complete.

Referring again to FIG. 25, the drive shaft 356 is mounted for rotation in bearing blocks 374 and 376 at either end thereof. One end 378 of the shaft 356 extends beyond the bearing 374 and has a large pulley member 380 attached thereto. As can be seen in FIG. 11, a motor 382 for the blade drive 68 has a small drive pulley 384 attached to its output end. A drive belt 386 is trained about the drive pulley 384 and the driven pulley 380 to impart rotation to the drive shaft 356 upon operation of the motor 382. Accordingly, the output speed of the motor 382 and the speed reduction provided by the relative sizing of the pulleys 380 and 384 will govern the speed at which the blade mount bars 290 and 292 and thus the blades 58 carried thereby reciprocate for slicing of the chubs 26 into stacks 12 of meat slices 30. It has been found that a preferred range of reciprocating blade travel of approximately 7" to 12" in conjunction with the preferred operation force of 10 psi of the cylinder 66 for driving the pusher member 270 against the chub 26 to advance it through the blades 58 provides well-formed meat slices 30.

Figure 28:
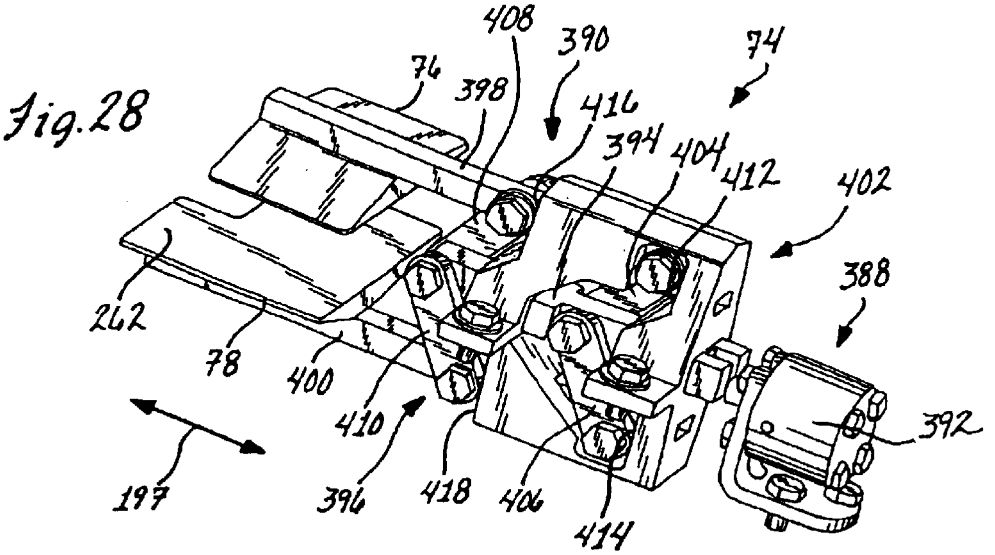
FIG. 28 is a color schematic perspective view of a chub centering mechanism showing upper and lower shiftable plate members and a linkage actuation system therefor operated by a pressure source to keep the plate members equally spaced from a center point therebetween.
Figure 29:
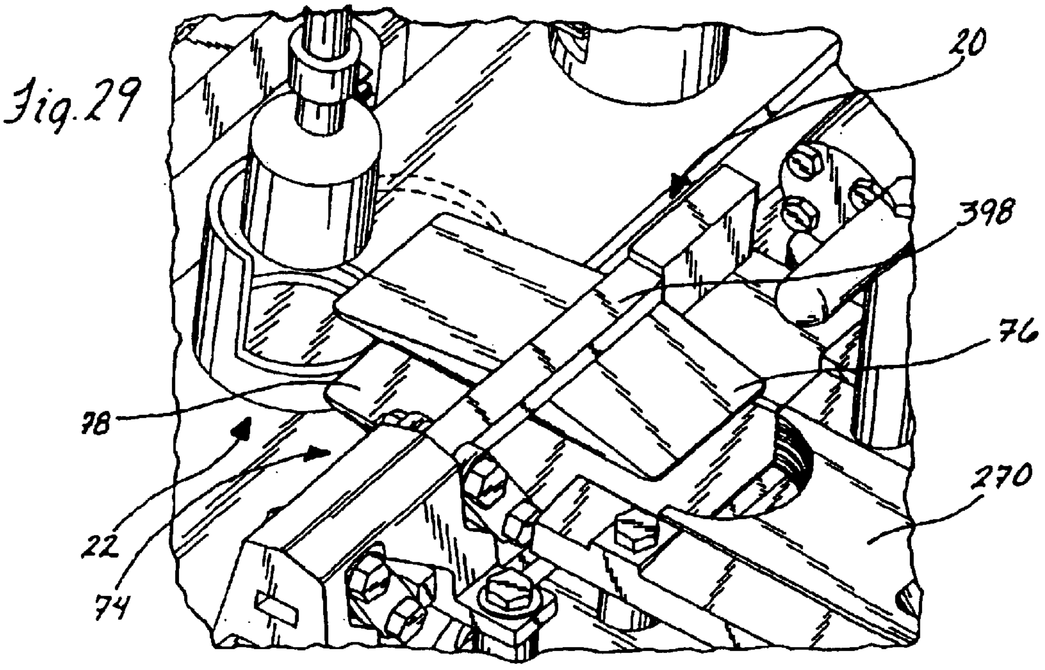
FIGS. 29 and 30 are color schematic perspective views of the chub pusher member, the chub centering mechanism, and an insertion station showing the chub pusher member traveling between the plate members and to the insertion station.

Each of the operating units 174 includes a chub centering mechanism 74, as shown in FIGS. 28–30. As previously discussed, the centering mechanism 74 operates to keep the vertical center of the chub 26 held between the upper and lower plate members 76 and 78 aligned with the vertical center of the blades 58 in a blade set 294, e.g. at the third blade 58 from the top or bottom of a five blade 58 blade set 294. This ensures that the upper and lower slices 30 formed from a chub 26 will be of equal thickness despite minor variation in the axial heights of different chubs 26.

The chub 26 is pushed between the members 76 and 78 via the lead-in surface 262 provided on member 78 by a paddle member 260, as previously described. A pressure source 388 drives a linkage system 390 that maintains pressure equally distributed on either side of a center line of force application to keep the chub 26 centered with respect thereto with the chub held between the plates 76 and 78 engaged against the faces 34 and 36 thereof.

More specifically, a small pneumatic cylinder 392 is operable to exert pressure along an output shaft member 394 having link members generally designated 396 pivotally attached thereto at one end thereof and at their other ends pivotally attached to parallel shafts 398 and 400 of the respective plate members 76 and 78. The link members 396 are operable to allow the plates 76 and 78 to shift up and down to accommodate for changes in height of the chubs 26 and to tie these movements of the plate members 76 and 78 to each other.

A guide frame 402 is provided for the link members 396. The link members 396 include a pair of upper and lower proximate link members 404 and 406 and a pair of upper and lower distal link members 408 and 410. Guide surfaces 412–418 are provided on the frame 402 corresponding to ends of the links 404–410 pivotally attached to the plate shafts 398 and 400. Accordingly, as the shaft member 394 advances relative to the cylinder 392, the ends of the links 404–410 will ride on their corresponding guide surfaces 412–418 and move toward the shaft member 394 causing the plate members 76 and 78 to move in equal amounts toward each other. Likewise, when the shaft member 394 retracts relative to the cylinder 392, the ends of the links 404–410 will ride on the associated surfaces 412–418 away from the shaft member 394 shifting the plates 76 and 78 in equal amounts away from each other.

As is apparent, should a chub 26 that is larger in size than a previously processed chub 26 be slid between the plate members 76 and 78 via the lead-in surface 262, the above-described linkage system 390 will cause the plate member 78 to shift downwardly while the plate member 76 will shift an equal and opposite amount upwardly, thereby keeping the vertical center of the chub 26 that is to be processed next at the same location as the vertical center of the previously processed smaller chub 26. In a like manner, any movement of one of the plates 76 or 78 to accommodate a smaller chub 26 than one that was previously processed will also include a corresponding movement of the other plate member 76 or 78 in an equal amount toward the other plate 76 or 78 thereby keeping the vertical centers of the chubs 26 identical.

Referring more specifically to FIGS. 29 and 30, there it can be seen that the plate members 76 and 78 extend in the direction 215 beyond their respective shafts 398 and 400. In addition, it is noted that the shafts 398 and 400 extend in the direction 197 parallel to bars 264, 266 and bars 290, 292. The shafts 398 and 400 will be disposed between the bar 264 or 266, depending on which side of the table 190 the centering mechanism 74 is located, and the pair of blade mount bars 290, 292 on that side of the table 190. The plates 76 and 78 include portions 420 and 422, respectively, that extend in the direction 215 beyond the adjacent blade mount bars 290 and 292 with the upper plate portion 420 extending above the uppermost blade 58 in the associated blade set 294 and the lower plate portion 424 extending below the lowest blade 58 in the blade set 294. The plate portions 420 and 422 extend past the innermost blade mount bar 292 to the insertion station 22.

The insertion stations 22 for each of the operating units 174 is at the center of the table 190 so that all four insertion stations 22 are aligned with each other, as best seen in FIG. 12. Thus, the distal ends of the plate portions 420 and 422 terminate adjacent the insertion stations 22 at the center of the table 190, as can be seen in FIGS. 29 and 30. The chub pusher member 270 is advanced by operation of its cylinder 66 to its retracted state such that the arcuate end portion 62 thereof travels between the upper and lower members 76 and 78 of the chub centering device 74 and past the distal ends of the respective plate portions 420 and 422 to deposit the sliced chub 26 in its stacked form at the insertion station 22, as depicted in FIGS. 29–32.

Referring to FIGS. 32–37, the insertion station 22 includes a receptacle 424 for receiving the stacks 12 as they are slid out from between the centering mechanism members 76 and 78 via the chub pusher member 270. The receptacle 424 can include an arcuate or concave upstanding wall 426 facing the pusher member arcuate engagement end 62 such that when the pusher member 270 has been fully advanced, the engagement end face 62 will cooperate with the concave wall 426 to completely encircle the chub outer surface 38 about 360° thereof. To this end, in the preferred form, the upstanding wall 426 will extend approximately 180° to cooperate with the preferred approximately 180° of curvature of the pusher member arcuate end 62, as shown in FIG. 32.

Figure 33:
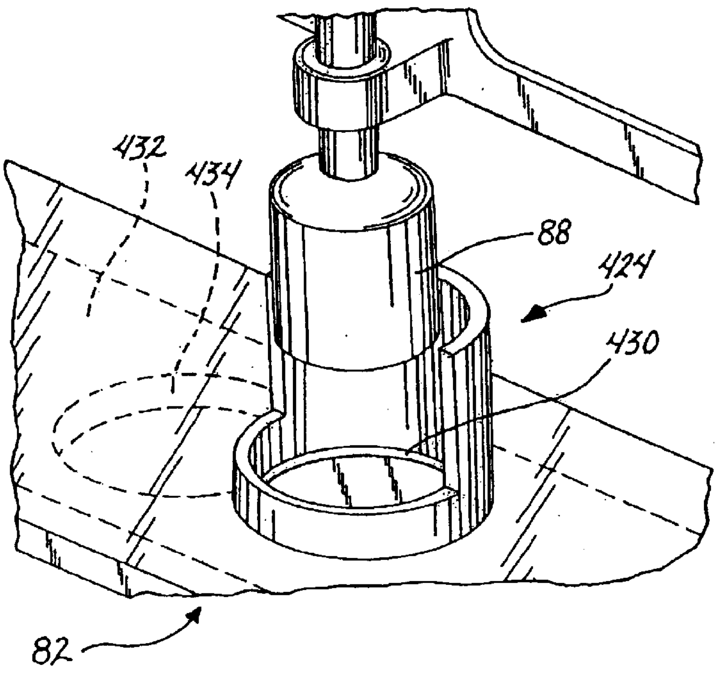
FIGS. 33 and 34 are color schematic perspective views of a stack guide and a gating mechanism at the chub insertion station showing an aperture of a gate member of the gating mechanism indexed to the receptacle and an enlarged weighted head of the guide shifting downwardly through a bottom opening in the receptacle and through the aligned gate member aperture.
Figure 34:
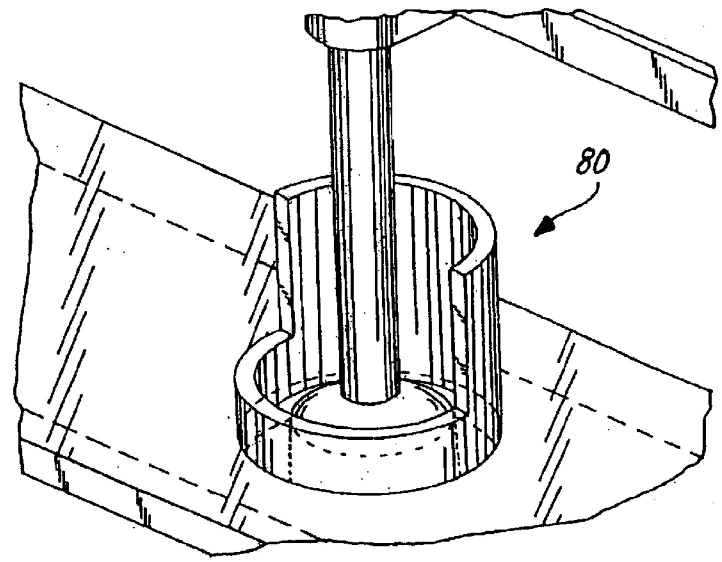
Figure 35:
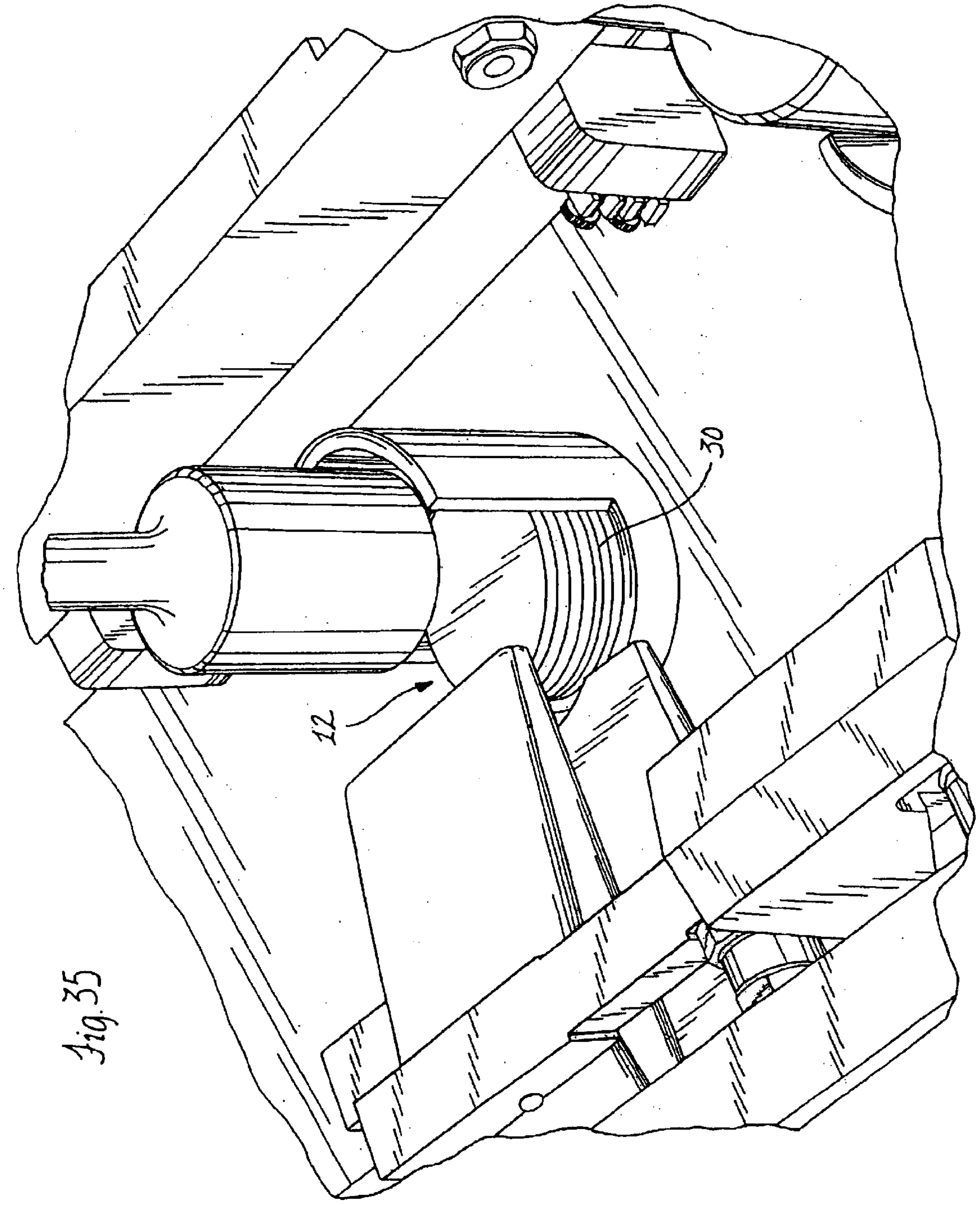
FIGS. 35–37 are color photographic views of the operation at the insertion station showing a stack in the receptacle, the weighted engagement head brought into engagement therewith, and the gate member indexed to bring its aperture into alignment with the receptacle opening allowing the stack and engaged head to fall therethrough.
Figure 36:
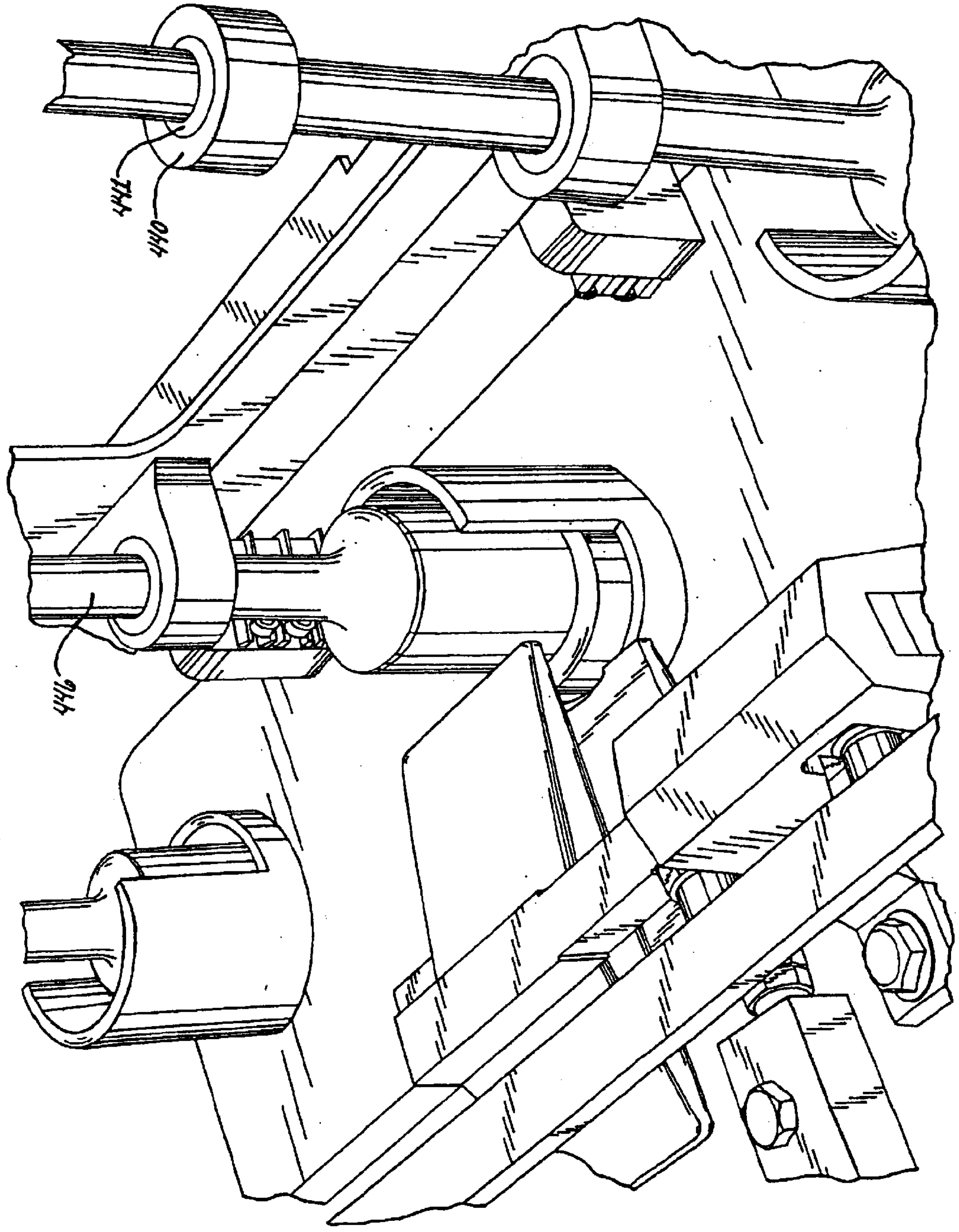

A small, cylindrical portion 428 can be raised from the table 190 at the bottom of the receptacle 424, a portion of which forms the bottom of the wall 426 and is integral therewith. The cylindrical portion 428 has a height corresponding generally to the level at which the centering mechanism lower member 78 is raised above the table 190. Referring to FIGS. 33 and 34, at the bottom of the receptacle 426, a cut-out opening 430 is formed in the table 190. The stack gating mechanism 82 is in the form of an elongate, apertured gate member 432 that is slidingly indexed back and forth between support and release positions thereof. In the support position, a circular aperture 434 thereof, substantially corresponding in shape to the cut-out opening 430 and slightly larger than the diameter across the chub faces 34 and 36 is shifted so as to be out of alignment with the receptacle 424, as shown in FIGS. 35 and 36. After the stack 12 is received in the receptacle 424 and the receiving tray 14 is indexed into alignment with the station 22, the gate member 432 can then be indexed to bring the aperture 434 thereof into alignment with the receptacle opening 430 to allow the stack 12 to fall into the aligned tray compartment 28 therebelow.

More particularly, after the chub pusher member 270 has been advanced to shift the stack 12 to the insertion station 22 (FIG. 32) via operation of the power cylinder 66 thereof to its retracted state, the cylinder 66 is again fired to its extended state to retract the pusher member 270 (FIG. 35).

Thereafter, the stack guide 84 is operable via actuator 86 thereof to bring the weighted engagement head 88 into contact with the top face 34 or 36 of the chub 26, as shown in FIG. 36. At this time, the gate member 432 is indexed to its release position shown in FIGS. 34 and 37 as by a power actuator or cylinder (not shown) whereby the stack 12 falls under the guidance of stack guide head 88 into the aligned compartment 28 therebelow.

Since all four insertion stations are aligned centrally on the table 190, the gate member 432 can extend in the longitudinal direction 197 to each of the stations 22 and be provided with four apertures 434 for each of the station receptacles 424. With the gate member 432 in its support position, and four stacks 12 at each of the insertions stations 22, the stack guide actuator 86 is operable to bring the weighted engagement heads 88 at each station 22 into engagement with the chubs 26, as described above. More specifically, the stack guide actuator 86 can include a single common power cylinder in the form of pneumatic cylinder 436 that shifts a framework assembly 438 up and down vertically as the cylinder plunger 209 is advanced and retracted, respectively. The framework 438 includes a plurality of lugs 440 formed thereon which can include sleeve bushings 441 pressed therein. The framework assembly 438 extends longitudinally in the direction 197 centrally along the table 190 and is guided for its vertical movement by vertical guide rods 442 and 444, extending through the bushings 441 and mounted to the table 190 adjacent the longitudinal ends thereof. The weighted engagement heads 88 are integrally formed at the bottom of each of the shafts 446 and enlarged relative thereto so as to be slightly smaller than the chub faces 34, 36 for fitting through the openings 430 and 434. The shafts 446 are fixedly attached to the framework assembly 438 via the mounting lugs 440 for vertical shifting therewith.

Figure 37:
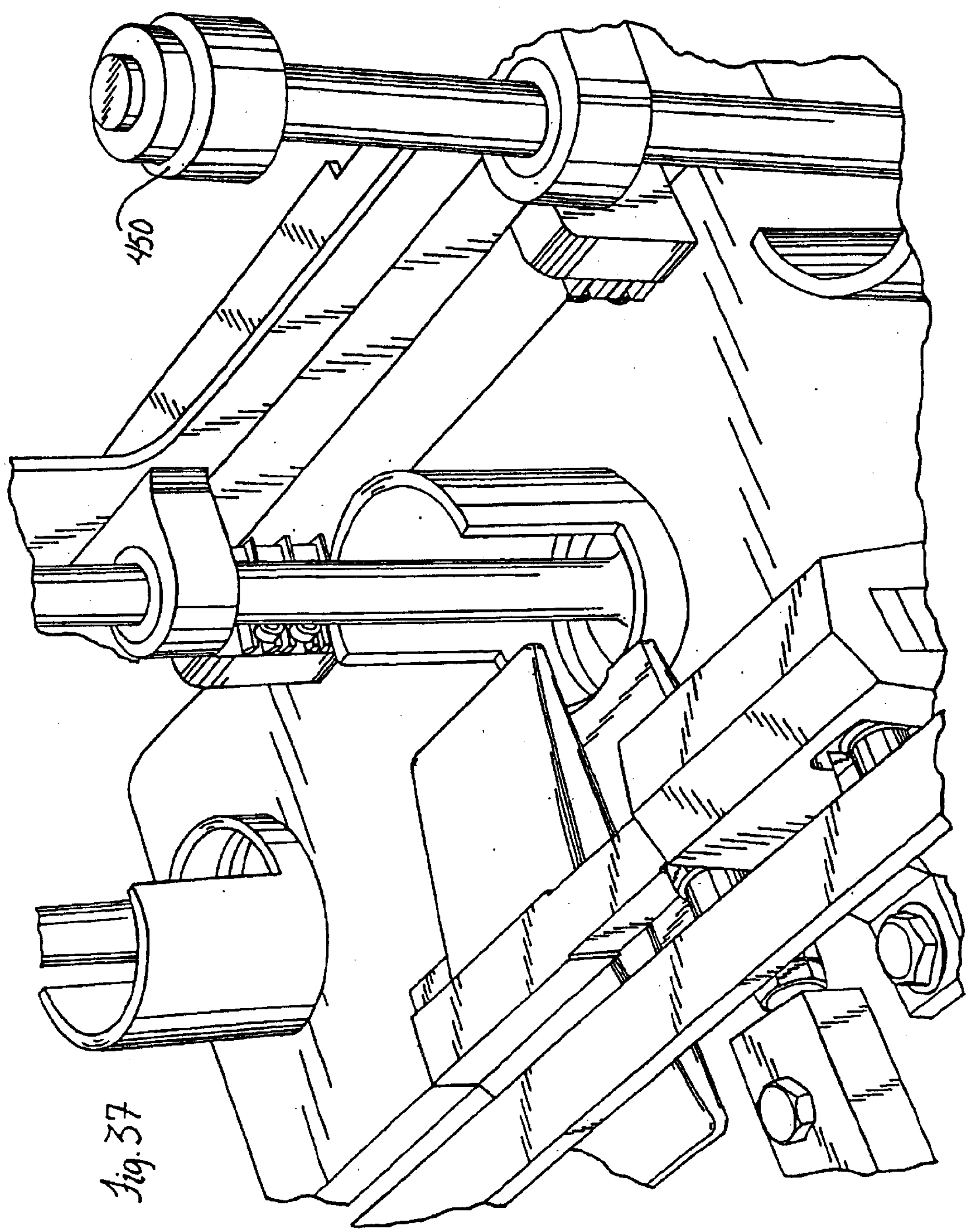

Accordingly, after the pusher member 270 has shifted a stack 12 into the insertion station receptacle 424, the pneumatic cylinder 436 is evacuated to allow the plunger 209 to retract therein with the weighted engagement heads 88 on the bottom ends of the shafts 436 resting with its entire weight on the top face 34 or 36 of the stacks 12. Before the gate member 432 is shifted to its release position, the tray conveyor in the form of a pin conveyor 80 will be indexed so that the compartments 28 of four of adjacent packages or trays 14 extending in direction 197 are aligned below the four receptacles 424. With the tray compartments 28 so aligned, the gate member 432 can then be slidingly indexed to its release position, and the stacks 12 will fall into the aligned compartments 28 with the engagement heads 88 falling a predetermined distance with the stack 12, as shown in FIG. 37. Thus, the engagement heads 88 will guide the stack 12 for a vertical fall and oppose any tendency for the stack slices 30 to shift out from the desired cylindrical configuration such as due to outside influences during the descent of the stack 12. For instance, if there is a tendency for the stack 12 to start shifting so that its axis is tilted from the vertical, this tendency for shifting will be transferred between the slices 30 to the topmost slice in the stack 12. However, because the head 88 is engaged flush against the top slice keeping it properly vertically aligned, this will resist any shifting tendency in the remainder of the stack 12 thus maintaining it in its well-formed configuration with its axis vertically oriented which, in turn, allows the stack 12 to properly fit into the aligned compartment 28 therebelow such as without having the slices 30 engage against sidewalls 28*a* of the compartments 28 as they fall therein.

The heads 88 preferably do not fall the entire distance corresponding to the distance the stacks 12 fall so that with the stacks 12 received in the tray compartments 28, the bottom 448 of the engagement head 88 will be spaced from the uppermost slice 30 in the stack 12. In this manner, when the cylinder 436 is fired to its extended state for lifting the heads 88 back through the aligned openings 430 and 434, there will be no problems relating to sticking of the meat slices 30 to the head 88 and thus disturbing the well-formed stack 12 placed into the tray compartment 28. For this purpose, washers 450 fixedly attached to the shafts 446 at a predetermined position thereon such as disposed adjacent the top thereof can engage a vertically fixed bearing lug 440 through which the shaft 446 extends to limit the downward travel of the weighted engagement head 88. It is the distance between the washer 450 and the fixed lug 440 that will determine the distance the head 88 travels in the downward direction, with this distance sized to be slightly less than the travel distance of the stacks 12 from the table 190 into the tray compartment 28, as previously discussed.

While there have been illustrated and described particular embodiments of the present invention, it will be appreciated that numerous changes and modifications will occur to those skilled in the art, and it is intended in the appended claims to cover all those changes and modification which fall within the true spirit and scope of the present invention.

We claim:

1. An automated system for slicing meat and placing the sliced meat in stack into a package therefor, the system comprising:

a slicing station including a chub slicer for slicing a chub of predetermined size from a larger preformed log of meat having axially spaced ends prior to being fed to the slicer, the predetermined chub size having an axial length smaller than that of the log and substantially corresponding to that of a predetermined amount of meat to be placed in a compartment of the package;

a chub harping station including spaced harping blades and a chub advancement mechanism, the harping station receiving chubs from the slicing station with the chubs pushed past the blades with a predetermined amount of force via the chub advancement mechanism to form a predetermined number of stacked meat slices from the chub so that the stacked meat slices are formed from the log by two slicing stages in the slicing station and the chub harping station; and a stack insertion station for receiving the stacked meat slices from the harping station and including a stack guide that substantially maintains control over the stack of meat slices for automated transfer thereof into the package compartment.

2. The system of claim 1 wherein the stack insertion station is adjacent to the chub harping station so that the advancement mechanism of the harping station feeds the stacked meat slices to the stack insertion station, and a conveyor between the slicing station and the chub harping station that transports the chubs from the slicing station to the harping station.

3. The system of claim 1 wherein the chub slicer includes a rotary blade having opposite sides with substantially parallel planar cutting surface portions, and a slotted log support to allow the blade to pass the log support for slicing through the log fully supported thereon on either side of the blade so that sliced end surfaces of the chubs are substantially planar for generating well formed slices from the chubs at the harping station.

4. The system of claim 1 wherein the harping blades have an elongate flat configuration with a cutting edge formed along the length thereof, and the harping station includes a drive and blade mount assembly that cooperate to allow the blades to undergo reciprocating movement in the lengthwise direction of the blades transverse to the pushing of the chubs so that the cutting edges slice through the chub with the predetermined force amount of the advancement mechanism minimized to avoid deflecting the blades with the pushed chub.

5. The system of claim 4 wherein the drive is an eccentric drive, and a pivotal actuator between the eccentric drive and blade mount assembly that transfers output of the eccentric drive to reciprocating motion of the blade mount.

6. The system of claim 4 wherein the chubs have substantially flat parallel ends and a cylindrical outer surface extending between the ends, a pusher of the advancement mechanism, and the engagement portion is an arcuate chub engagement portion of the pusher sized to engage the chub for the full distance along of the outer surface between the ends of the chub and having slots to allow the blades to pass therethrough as engagement portion travels past the blades, and a chub centering mechanism including opposing members each one of which presses substantially equally against an opposite end of the chub for forming end slices of substantially even thickness in a stack of meat slices despite variations in chub size.

7. The system of claim 1 wherein the stack insertion station includes a package delivery conveyor that aligns packages with the stacks of meat slices for receipt in a compartment thereof, and the stack guide includes an actuator which causes the guide to push on an end of the stack with the package in alignment for shifting the meat slices into the package compartment while maintaining the slices in the stack thereof.

8. The system of claim 7 wherein the stack is vertically oriented at the stack insertion station, the stack guide includes is a weight that engages against a topmost slice in the stack for controllably shifting the stack downwardly into the package compartment, and a stack gating mechanism at the insertion station that has a support position for supporting the vertical stack, and a release position to allow the stack with the weight thereagainst to fall into the compartment of the package aligned therebelow.

* * * * *